United States Patent
Templeman et al.

(10) Patent No.: US 9,549,213 B2
(45) Date of Patent: Jan. 17, 2017

(54) DYNAMIC TUNER ALLOCATION

(71) Applicant: Echostar Technologies, LLC, Englewood, CO (US)

(72) Inventors: Mark Templeman, Parker, CO (US); Yunfeng Yang, Aurora, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 677 days.

(21) Appl. No.: 13/801,994

(22) Filed: Mar. 13, 2013

(65) Prior Publication Data

US 2013/0243398 A1     Sep. 19, 2013

Related U.S. Application Data

(60) Provisional application No. 61/611,483, filed on Mar. 15, 2012.

(51) Int. Cl.
*H04N 5/76* (2006.01)
*H04N 21/4147* (2011.01)
(Continued)

(52) U.S. Cl.
CPC ......... *H04N 21/4147* (2013.01); *G11B 27/026* (2013.01); *G11B 27/28* (2013.01); *H04N 5/4401* (2013.01); *H04N 5/50* (2013.01); *H04N 5/76* (2013.01); *H04N 5/775* (2013.01); *H04N 5/782* (2013.01); *H04N 5/91* (2013.01); *H04N 9/79* (2013.01); *H04N 9/797* (2013.01); *H04N 9/87* (2013.01); *H04N 21/242* (2013.01); *H04N 21/262* (2013.01); *H04N 21/4263* (2013.01); *H04N 21/4302* (2013.01); *H04N 21/4334* (2013.01); *H04N 21/4335* (2013.01); *H04N 21/4532* (2013.01); *H04N 21/4583* (2013.01);
(Continued)

(58) Field of Classification Search
None
See application file for complete search history.

(56) References Cited

U.S. PATENT DOCUMENTS

| | | | |
|---|---|---|---|
| 4,706,121 A | 11/1987 | Young | |
| 4,723,246 A | 2/1988 | Weldon, Jr. | |

(Continued)

FOREIGN PATENT DOCUMENTS

| | | |
|---|---|---|
| CN | 1595975 A | 3/2005 |
| CN | 1615017 A | 5/2005 |

(Continued)

OTHER PUBLICATIONS

U.S. Appl. No. 13/795,914, filed Mar. 6, 2013, Non-Final Office Action mailed Oct. 11, 2013, 17 pages.

(Continued)

*Primary Examiner* — Heather Jones
(74) *Attorney, Agent, or Firm* — Kilpatrick Townsend & Stockton LLP

(57) ABSTRACT

In response to receiving a request, a current status of each one of a number of tuners of a television receiver may be determined. A ranking may be assigned to each one of the number of tuners based on an associated determined status. A listing may be generated based on the ranking and, when selected, a particular tuner of ranking greater than other ones of the plurality of tuners may be allocated for the recording of a particular broadcast program.

15 Claims, 7 Drawing Sheets

(51) Int. Cl.

| | | |
|---|---|---|
| *H04N 5/91* | (2006.01) | |
| *H04N 5/50* | (2006.01) | |
| *H04N 9/87* | (2006.01) | |
| *H04N 9/79* | (2006.01) | |
| *H04N 21/472* | (2011.01) | |
| *H04N 9/797* | (2006.01) | |
| *H04N 5/782* | (2006.01) | |
| *H04N 21/426* | (2011.01) | |
| *H04N 21/433* | (2011.01) | |
| *H04N 5/44* | (2011.01) | |
| *G11B 27/28* | (2006.01) | |
| *H04N 21/43* | (2011.01) | |
| *H04N 21/458* | (2011.01) | |
| *H04N 5/775* | (2006.01) | |
| *H04N 21/4335* | (2011.01) | |
| *H04N 21/475* | (2011.01) | |
| *G11B 27/026* | (2006.01) | |
| *H04N 21/45* | (2011.01) | |
| *H04N 21/242* | (2011.01) | |
| *H04N 21/83* | (2011.01) | |
| *H04N 21/262* | (2011.01) | |
| *H04N 21/84* | (2011.01) | |
| *H04N 21/482* | (2011.01) | |
| *H04N 7/20* | (2006.01) | |

(52) U.S. Cl.
CPC .... *H04N 21/4755* (2013.01); *H04N 21/47202* (2013.01); *H04N 21/47214* (2013.01); *H04N 21/47217* (2013.01); *H04N 21/482* (2013.01); *H04N 21/4821* (2013.01); *H04N 21/83* (2013.01); *H04N 21/84* (2013.01); *H04N 7/20* (2013.01); *H04N 21/4826* (2013.01)

(56) References Cited

U.S. PATENT DOCUMENTS

| | | |
|---|---|---|
| 4,802,215 A | 1/1989 | Mason |
| 5,187,589 A | 2/1993 | Kono et al. |
| 5,335,277 A | 8/1994 | Harvey et al. |
| 5,483,277 A | 1/1996 | Granger |
| 5,488,658 A | 1/1996 | Hirashima |
| 5,541,738 A | 7/1996 | Mankovitz |
| 5,642,153 A | 6/1997 | Chaney et al. |
| 5,682,597 A | 10/1997 | Ganek et al. |
| 5,684,969 A | 11/1997 | Ishida |
| 5,724,646 A | 3/1998 | Ganek et al. |
| 5,805,763 A | 9/1998 | Lawler et al. |
| 5,974,218 A | 10/1999 | Nagasaka et al. |
| 6,049,333 A | 4/2000 | LaJoie et al. |
| 6,263,504 B1 | 7/2001 | Ebisawa |
| 6,453,115 B1 | 9/2002 | Boyle |
| 6,628,891 B1 | 9/2003 | Vantalon et al. |
| 6,701,528 B1 | 3/2004 | Arsenault et al. |
| 6,766,523 B2 | 7/2004 | Herley |
| 6,798,971 B2 | 9/2004 | Potrebic |
| 6,938,208 B2 | 8/2005 | Reichardt |
| 7,024,676 B1 | 4/2006 | Klopfenstein |
| 7,409,140 B2 | 8/2008 | Rodriguez et al. |
| 7,487,529 B1 | 2/2009 | Orlick |
| 7,490,169 B1 | 2/2009 | Ogdon et al. |
| 7,493,312 B2 | 2/2009 | Liu et al. |
| 7,505,081 B2 | 3/2009 | Eshleman |
| 7,542,656 B2 | 6/2009 | Cho et al. |
| 7,577,751 B2 | 8/2009 | Vinson et al. |
| 7,590,993 B1 | 9/2009 | Hendricks et al. |
| 7,684,672 B2 * | 3/2010 | Matoba .................. H04N 5/76 386/297 |
| 7,715,552 B2 | 5/2010 | Pinder et al. |
| 7,730,517 B1 | 6/2010 | Rey et al. |
| 7,739,711 B2 | 6/2010 | Finseth et al. |
| 7,760,986 B2 | 7/2010 | Beuque |
| 7,804,861 B2 | 9/2010 | Kim |
| 7,848,618 B2 | 12/2010 | Potrebic et al. |
| 7,856,557 B2 | 12/2010 | Beuque |
| 7,926,078 B2 | 4/2011 | Arsenault et al. |
| 7,929,697 B2 | 4/2011 | McNeely et al. |
| 7,962,937 B2 | 6/2011 | Cho et al. |
| 8,006,268 B2 | 8/2011 | Sloo |
| 8,201,194 B2 | 6/2012 | Wijnands et al. |
| 8,321,466 B2 | 11/2012 | Black et al. |
| 8,364,671 B1 | 1/2013 | Sinton et al. |
| 8,437,622 B2 | 5/2013 | Casagrande |
| 8,447,170 B2 | 5/2013 | Casagrande |
| 8,566,873 B2 | 10/2013 | Sie et al. |
| 8,584,167 B2 | 11/2013 | Vanduyn |
| 8,606,088 B2 | 12/2013 | Kummer et al. |
| 8,627,349 B2 | 1/2014 | Kirby et al. |
| 8,660,412 B2 | 2/2014 | Kummer et al. |
| 8,763,027 B2 | 6/2014 | Martch |
| 8,774,608 B2 | 7/2014 | Kummer et al. |
| 8,819,722 B2 | 8/2014 | Kummer et al. |
| 8,819,761 B2 | 8/2014 | Minnick |
| 8,850,476 B2 | 9/2014 | VanDuyn et al. |
| 8,867,893 B2 | 10/2014 | Kirby |
| 8,959,544 B2 | 2/2015 | Kummer et al. |
| 8,959,566 B2 | 2/2015 | Kummer |
| 8,989,562 B2 | 3/2015 | Kummer et al. |
| 8,997,153 B2 | 3/2015 | Templeman |
| 9,031,385 B2 | 5/2015 | Casagrande et al. |
| 9,043,843 B2 | 5/2015 | Templeman et al. |
| 9,055,274 B2 | 6/2015 | Casagrande |
| 9,088,763 B2 | 7/2015 | Martch et al. |
| 9,113,222 B2 | 8/2015 | VanDuyn |
| 9,177,605 B2 | 11/2015 | Minnick et al. |
| 9,177,606 B2 | 11/2015 | Kirby |
| 9,185,331 B2 | 11/2015 | Martch et al. |
| 9,191,694 B2 | 11/2015 | Casagrande |
| 9,202,524 B2 | 12/2015 | Martch et al. |
| 9,264,779 B2 | 2/2016 | Kirby et al. |
| 9,269,397 B2 | 2/2016 | Casagrande et al. |
| 9,349,412 B2 | 5/2016 | Templeman |
| 9,350,937 B2 | 5/2016 | Kummer et al. |
| 9,357,159 B2 | 5/2016 | Martch et al. |
| 9,361,940 B2 | 6/2016 | Minnick |
| 2001/0028782 A1 | 10/2001 | Ohno et al. |
| 2001/0033736 A1 | 10/2001 | Yap et al. |
| 2001/0034787 A1 | 10/2001 | Takao et al. |
| 2002/0044658 A1 | 4/2002 | Wasilewski et al. |
| 2002/0054752 A1 | 5/2002 | Wood et al. |
| 2002/0055343 A1 | 5/2002 | Stetzler et al. |
| 2002/0087979 A1 | 7/2002 | Dudkiewicz et al. |
| 2002/0087983 A1 | 7/2002 | Son et al. |
| 2002/0092021 A1 | 7/2002 | Yap et al. |
| 2002/0095510 A1 | 7/2002 | Sie et al. |
| 2002/0097340 A1 | 7/2002 | Takagi et al. |
| 2002/0116705 A1 | 8/2002 | Perlman et al. |
| 2002/0120925 A1 | 8/2002 | Logan |
| 2002/0126221 A1 | 9/2002 | Link |
| 2002/0141431 A1 | 10/2002 | Tripathy |
| 2002/0144259 A1 | 10/2002 | Gutta et al. |
| 2002/0144266 A1 | 10/2002 | Goldman et al. |
| 2002/0152299 A1 | 10/2002 | Traversat et al. |
| 2002/0164147 A1 | 11/2002 | Suda |
| 2002/0168178 A1 | 11/2002 | Rodriguez et al. |
| 2002/0174430 A1 | 11/2002 | Ellis et al. |
| 2002/0184638 A1 | 12/2002 | Agnihotri et al. |
| 2002/0188943 A1 | 12/2002 | Freeman et al. |
| 2003/0005454 A1 | 1/2003 | Rodriguez et al. |
| 2003/0026423 A1 | 2/2003 | Unger et al. |
| 2003/0078930 A1 | 4/2003 | Surcouf et al. |
| 2003/0097659 A1 | 5/2003 | Goldman |
| 2003/0110514 A1 | 6/2003 | West et al. |
| 2003/0149988 A1 | 8/2003 | Ellis et al. |
| 2003/0152360 A1 | 8/2003 | Mukai et al. |
| 2003/0156826 A1 | 8/2003 | Sonoda et al. |
| 2003/0177492 A1 | 9/2003 | Kanou |
| 2003/0177495 A1 | 9/2003 | Needham et al. |
| 2003/0200548 A1 | 10/2003 | Baran et al. |
| 2003/0208763 A1 | 11/2003 | McElhatten et al. |
| 2003/0208767 A1 | 11/2003 | Williamson et al. |

(56) References Cited

U.S. PATENT DOCUMENTS

| | | |
|---|---|---|
| 2003/0226150 A1 | 12/2003 | Berberet et al. |
| 2004/0001087 A1 | 1/2004 | Warmus et al. |
| 2004/0003118 A1 | 1/2004 | Brown et al. |
| 2004/0015992 A1 | 1/2004 | Hasegawa et al. |
| 2004/0015999 A1 | 1/2004 | Carlucci et al. |
| 2004/0078829 A1 | 4/2004 | Patel et al. |
| 2004/0080672 A1 | 4/2004 | Kessler et al. |
| 2004/0103428 A1 | 5/2004 | Seok et al. |
| 2004/0128682 A1 | 7/2004 | Liga et al. |
| 2004/0133923 A1 | 7/2004 | Watson et al. |
| 2004/0162871 A1 | 8/2004 | Pabla et al. |
| 2004/0218905 A1 | 11/2004 | Green et al. |
| 2004/0242150 A1 | 12/2004 | Wright et al. |
| 2004/0268387 A1 | 12/2004 | Wendling |
| 2005/0002640 A1 | 1/2005 | Putterman et al. |
| 2005/0034171 A1 | 2/2005 | Benya |
| 2005/0083865 A1 | 4/2005 | Ashley et al. |
| 2005/0120049 A1 | 6/2005 | Kanegae et al. |
| 2005/0125683 A1 | 6/2005 | Matsuyama et al. |
| 2005/0147383 A1 | 7/2005 | Ihara |
| 2005/0180568 A1 | 8/2005 | Krause |
| 2005/0229213 A1 | 10/2005 | Ellis et al. |
| 2005/0237435 A1 | 10/2005 | Potrebic et al. |
| 2005/0271365 A1 | 12/2005 | Hisatomi |
| 2005/0273819 A1 | 12/2005 | Knudson et al. |
| 2005/0281531 A1 | 12/2005 | Unmehopa |
| 2006/0010464 A1 | 1/2006 | Azami |
| 2006/0020962 A1 | 1/2006 | Stark et al. |
| 2006/0056800 A1 | 3/2006 | Shimagami et al. |
| 2006/0075434 A1 | 4/2006 | Chaney et al. |
| 2006/0080716 A1 | 4/2006 | Nishikawa et al. |
| 2006/0085828 A1 | 4/2006 | Dureau et al. |
| 2006/0120523 A1 | 6/2006 | Kurotaki |
| 2006/0206819 A1 | 9/2006 | Tsuji et al. |
| 2006/0212900 A1 | 9/2006 | Ismail et al. |
| 2006/0215993 A1 | 9/2006 | Yamada |
| 2006/0257099 A1 | 11/2006 | Potrebic et al. |
| 2006/0274208 A1 | 12/2006 | Pedlow, Jr. |
| 2007/0016546 A1 | 1/2007 | De Vorchik et al. |
| 2007/0039032 A1 | 2/2007 | Goldey et al. |
| 2007/0061378 A1 | 3/2007 | Lee et al. |
| 2007/0154163 A1 | 7/2007 | Cordray |
| 2007/0157248 A1 | 7/2007 | Ellis |
| 2007/0157253 A1 | 7/2007 | Ellis et al. |
| 2007/0165855 A1 | 7/2007 | Inui |
| 2007/0183745 A1 | 8/2007 | White |
| 2007/0192586 A1 | 8/2007 | McNeely |
| 2007/0204288 A1 | 8/2007 | Candelore |
| 2007/0234395 A1 | 10/2007 | Dureau et al. |
| 2007/0250856 A1 | 10/2007 | Leavens et al. |
| 2007/0258596 A1 | 11/2007 | Kahn et al. |
| 2008/0022347 A1 | 1/2008 | Cohen |
| 2008/0044158 A1 | 2/2008 | Kido |
| 2008/0046929 A1 | 2/2008 | Cho et al. |
| 2008/0052743 A1 | 2/2008 | Moore |
| 2008/0074547 A1 | 3/2008 | Ida |
| 2008/0092164 A1 | 4/2008 | Agarwal et al. |
| 2008/0092181 A1 | 4/2008 | Britt |
| 2008/0101760 A1 | 5/2008 | Waller |
| 2008/0104534 A1 | 5/2008 | Park et al. |
| 2008/0127253 A1 | 5/2008 | Zhang et al. |
| 2008/0137850 A1 | 6/2008 | Mamidwar |
| 2008/0141322 A1 | 6/2008 | Jang et al. |
| 2008/0144747 A1 | 6/2008 | Tomizawa |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222678 A1 | 9/2008 | Burke et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0273856 A1 | 11/2008 | Bumgardner |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2008/0307217 A1 | 12/2008 | Yukimatsu et al. |
| 2009/0025027 A1 | 1/2009 | Craner |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0110367 A1 | 4/2009 | Fukui |
| 2009/0129741 A1 | 5/2009 | Kim |
| 2009/0129749 A1 | 5/2009 | Oyamatsu et al. |
| 2009/0136206 A1* | 5/2009 | Aisu ............... H04N 7/163 386/292 |
| 2009/0150941 A1 | 6/2009 | Riedl et al. |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0210912 A1 | 8/2009 | Cholas et al. |
| 2009/0235298 A1 | 9/2009 | Carlberg et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2009/0320084 A1 | 12/2009 | Azam et al. |
| 2009/0324203 A1 | 12/2009 | Wiklof |
| 2010/0020794 A1 | 1/2010 | Cholas et al. |
| 2010/0037282 A1 | 2/2010 | Iwata et al. |
| 2010/0043022 A1 | 2/2010 | Kaftan |
| 2010/0050225 A1 | 2/2010 | Bennett |
| 2010/0086277 A1 | 4/2010 | Craner |
| 2010/0095323 A1 | 4/2010 | Williamson et al. |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0146581 A1 | 6/2010 | Erk |
| 2010/0158479 A1 | 6/2010 | Craner |
| 2010/0158480 A1 | 6/2010 | Jung et al. |
| 2010/0162285 A1 | 6/2010 | Cohen et al. |
| 2010/0169926 A1 | 7/2010 | Westberg et al. |
| 2010/0195827 A1 | 8/2010 | Lee et al. |
| 2010/0217613 A1 | 8/2010 | Kelly |
| 2010/0232604 A1 | 9/2010 | Eklund, II |
| 2010/0235862 A1 | 9/2010 | Adachi |
| 2010/0239228 A1 | 9/2010 | Sano |
| 2010/0242079 A1 | 9/2010 | Riedl et al. |
| 2010/0246582 A1 | 9/2010 | Salinger et al. |
| 2010/0247067 A1 | 9/2010 | Gratton |
| 2010/0251304 A1 | 9/2010 | Donoghue et al. |
| 2010/0251305 A1 | 9/2010 | Kimble et al. |
| 2010/0254386 A1 | 10/2010 | Salinger et al. |
| 2010/0265391 A1 | 10/2010 | Muramatsu et al. |
| 2010/0284537 A1 | 11/2010 | Inbar |
| 2010/0293583 A1 | 11/2010 | Loebig et al. |
| 2010/0299528 A1 | 11/2010 | Le Floch |
| 2010/0306401 A1 | 12/2010 | Gilson |
| 2010/0313222 A1 | 12/2010 | Lee et al. |
| 2010/0319037 A1 | 12/2010 | Kim |
| 2010/0329645 A1 | 12/2010 | Sakamoto |
| 2011/0001879 A1 | 1/2011 | Goldey et al. |
| 2011/0007218 A1 | 1/2011 | Moran et al. |
| 2011/0043652 A1 | 2/2011 | King et al. |
| 2011/0078750 A1 | 3/2011 | Tam et al. |
| 2011/0080529 A1 | 4/2011 | Wong |
| 2011/0099364 A1 | 4/2011 | Robyr et al. |
| 2011/0131413 A1 | 6/2011 | Moon et al. |
| 2011/0138169 A1 | 6/2011 | Michel |
| 2011/0138424 A1 | 6/2011 | Vlot |
| 2011/0145854 A1 | 6/2011 | Bacon et al. |
| 2011/0150429 A1 | 6/2011 | Kaneko |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0235701 A1 | 9/2011 | Kim |
| 2011/0239249 A1 | 9/2011 | Murison et al. |
| 2011/0255002 A1 | 10/2011 | Witheiler |
| 2011/0286719 A1 | 11/2011 | Woods |
| 2011/0311045 A1 | 12/2011 | Candelore et al. |
| 2012/0183276 A1 | 7/2012 | Quan et al. |
| 2012/0195433 A1 | 8/2012 | Eppolito et al. |

(56) References Cited

U.S. PATENT DOCUMENTS

| | | |
|---|---|---|
| 2012/0198501 A1 | 8/2012 | Ruan et al. |
| 2012/0236933 A1 | 9/2012 | Saitoh |
| 2012/0278837 A1 | 11/2012 | Curtis et al. |
| 2012/0296745 A1 | 11/2012 | Harper et al. |
| 2012/0301104 A1 | 11/2012 | Dove |
| 2012/0311534 A1 | 12/2012 | Fox et al. |
| 2012/0311634 A1 | 12/2012 | Van Duyn |
| 2012/0331505 A1 | 12/2012 | Chun et al. |
| 2013/0014146 A1 | 1/2013 | Bhatia et al. |
| 2013/0014159 A1 | 1/2013 | Wiser et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0126889 A1 | 5/2014 | Kummer et al. |
| 2014/0130094 A1 | 5/2014 | Kirby et al. |
| 2014/0147102 A1* | 5/2014 | Shartzer ............ H04N 21/44222 386/341 |
| 2014/0201767 A1 | 7/2014 | Seiden et al. |
| 2014/0341377 A1 | 11/2014 | Kummer et al. |
| 2014/0344858 A1 | 11/2014 | Minnick |
| 2014/0363139 A1 | 12/2014 | Kirby |
| 2014/0376884 A1 | 12/2014 | Lovell |
| 2015/0040166 A1 | 2/2015 | Tamura et al. |
| 2015/0095948 A1 | 4/2015 | Kummer et al. |
| 2015/0104146 A1 | 4/2015 | Higuchi et al. |
| 2015/0121430 A1 | 4/2015 | Templeman |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1* | 8/2015 | Potrebic ............ H04N 21/4263 725/131 |
| 2015/0245113 A1 | 8/2015 | Casagrande |
| 2015/0319400 A1 | 11/2015 | Golyshko |
| 2016/0073144 A1 | 3/2016 | Robinson |
| 2016/0080800 A1 | 3/2016 | Casagrande |
| 2016/0105711 A1 | 4/2016 | Martch et al. |
| 2016/0134926 A1 | 5/2016 | Casagrande et al. |
| 2016/0198215 A1 | 7/2016 | Hardy |

FOREIGN PATENT DOCUMENTS

| | | |
|---|---|---|
| CN | 101202600 A | 6/2008 |
| CN | 101310532 A | 11/2008 |
| CN | 101 404 780 A | 4/2009 |
| CN | 101978690 A | 2/2011 |
| EP | 0 903 743 A | 3/1999 |
| EP | 0 973 333 A | 1/2000 |
| EP | 1 001 631 A1 | 5/2000 |
| EP | 1168 347 A | 1/2002 |
| EP | 1372339 A2 | 12/2003 |
| EP | 1 447 983 A1 | 8/2004 |
| EP | 1 742 467 A2 | 1/2007 |
| EP | 2 018 059 A1 | 1/2009 |
| EP | 2 317 767 A1 | 5/2011 |
| EP | 2 357 563 A1 | 8/2011 |
| EP | 1 667 452 B1 | 11/2011 |
| EP | 2 403 239 A1 | 1/2012 |
| EP | 2 541 929 A1 | 1/2013 |
| EP | 2 826 197 A1 | 1/2015 |
| EP | 2 826 238 A1 | 1/2015 |
| GB | 2 459 705 A | 11/2009 |
| IN | 9740/CHENP/2013 A | 9/2014 |
| IN | 7408/CHENP/2014 A | 1/2016 |
| IN | 9493/CHEN/2013 A | 6/2016 |
| JP | 2007 116525 A | 5/2007 |
| JP | 2010165058 A | 7/2010 |
| WO | 98/12872 A1 | 3/1998 |
| WO | 01/24532 A1 | 4/2001 |
| WO | 02/41625 A1 | 5/2002 |
| WO | 2004/057610 A1 | 7/2004 |
| WO | 2007/047410 A2 | 4/2007 |
| WO | 2008/010118 A1 | 1/2008 |
| WO | 2008/010689 A1 | 1/2008 |
| WO | 2008/060486 A2 | 5/2008 |
| WO | 2011/027236 A1 | 3/2011 |
| WO | 2011/081729 A1 | 7/2011 |
| WO | 2012/003693 A1 | 1/2012 |
| WO | 2013/028824 A2 | 2/2013 |
| WO | 2013/028835 A1 | 2/2013 |
| WO | 2013028829 A2 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |
| WO | 2016/066443 A1 | 5/2016 |
| WO | 2016/111817 A1 | 7/2016 |

OTHER PUBLICATIONS

U.S. Appl. No. 13/856,752, filed Apr. 4, 2013 Notice of Allowance mailed Feb. 10, 2015, 20 pages.
U.S. Appl. No. 13/797,173, filed Mar. 12, 2013 Notice of Allowance mailed Feb. 26, 2015, 19 pages.
U.S. Appl. No. 13/793,636, filed Mar. 11, 2013, Notice of Allowance mailed Jan. 28, 2015, 43 pages.
U.S. Appl. No. 13/800,477, filed Mar. 13, 2013 Notice of Allowance mailed Feb. 18, 2015, 18 pages.
Extended European Search Report for EP 12825474 mailed Jan. 7, 2015, 6 pages.
Extended European Search Report for EP 12825430 mailed Feb. 3, 2015, all pages.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.
International Search Report and Written Opinion of PCT/US2012/51992 mailed Nov. 2, 2012, 15 pages.
International Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Preliminary Report on Patentability for PCT/US2012/052002 mailed on Apr. 17, 2014, 10 pages.
International Search Report and Written Opinion of PCT/US2012/51964 mailed Nov. 2, 2012, 13 pages.
International Search Report and Written Opinion of PCT/US2012/052011 mailed Dec. 17, 2012, 44 pages.

(56) References Cited

OTHER PUBLICATIONS

International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
Author Unknown, "Move Networks is Delivering the Next Generation of Television," Move Networks, 2010, obtained online at http://movenetworks.com/, 2 pages.
Design and implementation of a multi-stream cableCARD with a high-speed DVB-common descrambler; Joonyoung Jung, Ohyung Kwon, Sooin Lee; In proceeding of: Proceedings of the 14th ACM International Conference on Multimedia, Santa Barbara, CA, USA, Oct. 23-27, 2006, 4 pages.
U.S. Appl. No. 13/149,852, filed May 31, 2011, Non-Final Office Action mailed Dec. 12, 2012, 9 pages.
U.S. Appl. No. 13/149,852, filed May 31, 2011, Final Office Action mailed Mar. 26, 2013, 13 pages.
U.S. Appl. No. 13/149,852, filed May 31, 2011, Notice of Allowance mailed Jul. 11, 2013, 13 pages.
U.S. Appl. No. 13/286,157, filed Oct. 31, 2011, Non-Final Office Action mailed Jan. 17, 2013, 20 pages.
U.S. Appl. No. 13/286,157, filed Oct. 31, 2011, Non-Final Office Action mailed Jul. 25, 2013, 49 pages.
U.S. Appl. No. 13/286,157, filed Oct. 31, 2011, Notice of Allowance mailed Feb. 3, 2014, 81 pages.
U.S. Appl. No. 13/215,702, filed Aug. 23, 2011, Notice of Allowance mailed Feb. 11, 2013, 13 pages.
U.S. Appl. No. 13/288,002, filed Nov. 2, 2011, Non-Final Office Action mailed Sep. 26, 2013, 15 pages.
U.S. Appl. No. 13/288,002, filed Nov. 2, 2011, Final Office Action mailed Mar. 27, 2014, 20 pages.
U.S. Appl. No. 13/302,852, filed Nov. 22, 2011, Non-Final Rejection mailed May 23, 2013, 19 pages.
U.S. Appl. No. 13/302,852, filed Nov. 22, 2011, Final Rejection mailed Dec. 9, 2015, 23 pages.
U.S. Appl. No. 13/324,831, filed Dec. 13, 2011, Non-Final Office Action mailed Feb. 28, 2013, 23 pages.
U.S. Appl. No. 13/324,831, filed Dec. 13, 2011, Notice of Allowance mailed Sep. 4, 2013, 22 pages.
U.S. Appl. No. 13/292,047, filed Nov. 8, 2011, Non-Final Office Action mailed Jan. 18, 2013, 17 pages.
U.S. Appl. No. 13/292,047, filed Nov. 8, 2011, Final Office Action mailed Aug. 19, 2013, 17 pages.
U.S. Appl. No. 13/614,899, filed Sep. 13, 2012, Non-Final Office Action mailed Feb. 5, 2013, 17 pages.
U.S. Appl. No. 13/614,899, filed Sep. 13, 2012, Non-Final Office Action mailed Sep. 17, 2013, 17 pages.
U.S. Appl. No. 13/614,899, filed Sep. 13, 2012, Final Office Action mailed Mar. 17, 2013, 41 pages.
U.S. Appl. No. 13/291,014, filed Nov. 7, 2012, Non-Final Office Action mailed Mar. 29, 2013, 21 pages.
U.S. Appl. No. 13/291,014, filed Nov. 7, 2011, Notice of Allowance mailed Aug. 7, 2013, 16 pages.
U.S. Appl. No. 13/215,598, filed Aug. 23, 2012, Non-Final Office Action mailed Jun. 20, 2013, 15 pages.
U.S. Appl. No. 13/215,598, filed Aug. 23, 2011, Final Office Action mailed Nov. 21, 2013, 23 pages.
U.S. Appl. No. 13/215,598, filed Aug. 23, 2011, Non-Final Office Action mailed Feb. 6, 2014, 12 pages.
U.S. Appl. No. 13/215,655, filed Aug. 23, 2011, Non-Final Office Action mailed Sep. 6, 2013, 27 pages.
U.S. Appl. No. 13/215,655, filed Aug. 23, 2011, Final Office Action mailed Dec. 18, 2013, 20 pages.
U.S. Appl. No. 13/215,916, filed Aug. 23, 2011, Notice of Allowance mailed Jan. 4, 2013, 10 pages.
U.S. Appl. No. 13/294,005, filed Nov. 11, 2011, Non-Final Office Action mailed Aug. 14, 2013, 32 pages.
U.S. Appl. No. 13/294,005, filed Nov. 11, 2011, Final Office Action mailed Jan. 3, 2014, 29 pages.
U.S. Appl. No. 13/592,976, filed Aug. 23, 2012, Notice of Allowance mailed Oct. 7, 2013, 18 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/829,350, filed Mar. 14, 2013, Non Final Office Action mailed Feb. 28, 2014, 29 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Non Final Office Action mailed Oct. 25, 2013, 79 pages.
U.S. Appl. No. 13/799,719, filed Mar. 13, 2013, Notice of Allowance mailed Apr. 23, 2014, 141 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
U.S. Appl. No. 14/095,860, filed Dec. 3, 2013 Final Office Action mailed May 1, 2015, 18 pages.
U.S. Appl. No. 14/060,388, filed Oct. 22, 2013 Notice of Allowance mailed Apr. 13, 2015, 44 pages.
U.S. Appl. No. 13/888,012, filed May 6, 2013 Non-Final Rejection mailed Apr. 6, 2015, 36 pages.
U.S. Appl. No. 13/801,968, filed Mar. 13, 2013 Non Final Office Action mailed May 21, 2015, 49 pages.
U.S. Appl. No. 13/614,899, filed Sep. 13, 2012 Notice of Allowance mailed Mar. 13, 2015, 35 pages.
U.S. Appl. No. 13/302,852, filed Nov. 22, 2011 Final Rejection mailed Mar. 30, 2015, 29 pages.
U.S. Appl. No. 13/215,598, filed Aug 23, 2011 Final Office Action mailed May 5, 2015, 17 pages.
European Search Report for EP 12825653 dated Mar. 11, 2015, 7 pages.
Supplementary European Search Report for Application No. EP 12825147 dated Mar. 27, 2015, 9 pages.
The Notice of Allowance by the Mexican Institute of Industrial Property for Mexican Patent Application No. MX/a/2013/014907 dated Feb. 20, 2015 is not translated into English, 1 page.
The Notice of Allowance by the Mexican Institute of Industrial Property for Mexican Patent Application No. MX/a/2013/014677 dated Mar. 19, 2015 is not translated into English, 1 page.
The second Office Action dated Feb. 26, 2015 for Mexican Patent Application No. MX/a/2013/014217 is not translated into English, 3 pages.
U.S. Appl. No. 14/467,959, filed Aug. 25, 2014 Notice of Allowance mailed Jun. 22, 2015, 36 pages.
U.S. Appl. No. 14/154,887, filed Jan. 14, 2014 Non-Final Rejection mailed Jul. 17, 2015, 33 pages.
U.S. Appl. No. 14/095,860, filed Dec. 3, 2013 Notice of Allowance mailed Jul. 13, 2015, 31 pages.
U.S. Appl. No. 14/043,617, filed Oct. 1, 2011, Final Office Action mailed Jul. 16, 2015, 45 pages.
U.S. Appl. No. 13/888,012, filed May 6, 2013, Notice of Allowance mailed Jul. 14, 2015, 18 pages.
U.S. Appl. No. 13/829,350, filed Mar. 14, 2013 Notice of Allowance mailed Jul. 24, 2015, 29 pages.
U.S. Appl. No. 13/799,604, filed Mar. 13, 2013, Notice of Allowance mailed May 29, 2015, 46 pages.
U.S. Appl. No. 13/302,852, filed Nov. 22, 2011, Notice of Allowance mailed Jun. 19, 2015, 26 pages.
U.S. Appl. No. 13/292,047, filed Nov. 8, 2011 Non-Final Office Action mailed Jul. 7, 2015, 28 pages.
U.S. Appl. No. 13/288,002, filed Nov. 2, 2011 Non Final Rejection mailed Jul. 28, 2015, 29 pages.
Supplementary European Search Report for EP 13761291.7 mailed Jul. 9, 2015, 8 pages.

(56) References Cited

OTHER PUBLICATIONS

The Notice of Allowance by the Mexican Institute of Industrial Property for Mexican Patent Application No. MX/a/2013/014671 dated Apr. 17, 2015, 1 page.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug. 23, 2011 Final Office Action mailed Jul. 2, 2014, 22 pages.
U.S. Appl. No. 13/294,005, filed Nov. 11, 2011 Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
U.S. Appl. No. 14/340,190, filed Jul. 24, 2014 Non-Final Rejection mailed Aug. 31, 2015, 74 pages.
U.S. Appl. No. 13/799,604, filed Mar. 13, 2013, Notice of Allowance mailed Jul. 24, 2015, 34 pages.
Extended European Search Report for EP 13760237.1 received Jul. 21, 2015, 8 pages.
First Office Action and Search Report from the State Intellectual Property Office (SIPO) for CN 201280031434.7, issued Jul. 17, 2015, 12 pages.
Office Action dated Jul. 31, 2015 for Mexican Patent Application No. MX/a/2014/009928, 2 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
U.S. Appl. No. 13/302,852, filed Nov. 22, 2011, Non-Final Rejection mailed Sep. 2, 2014, 28 pages.
U.S. Appl. No. 13/793,636, filed Mar. 11, 2013, Non-Final Office Action mailed Sep. 29, 2014, 27 pages.
U.S. Appl. No. 13/800,477, filed Mar. 13, 2013 Non-Final Office Action mailed Sep. 11, 2014, 34 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
International Search Report and Written Opinion of PCT/US2013/031440 mailed May 30, 2013, 14 pages.
International Search Report and Written Opinion of PCT/US2013/031440 mailed Sep. 25, 2014, 8 pages.
Author Unknown, "EE Launches home TV service in UK," dated Oct. 8, 2014, 3 pages. Retrieved on Oct. 13, 2014 from http://www.bbc.com/news/technology-29535279.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyand-telecoms/telecoms/11147319/E E-to-launch-TV-set-top-box.htm.
Author Unknown, "EE TV It's simply great television," Accessed on Oct. 13, 2014, 11 pages. Retrieved from https//ee.co.uk/ee-and-me/ee-tv.
International Search Report and Written Opinion of PCT/US2013/32176 mailed on Jun. 25, 2013, 15 pages.
International Search Report and Written Opinion of PCT/US2013/031565 mailed on May 31, 2013, 103 pages.
International Search Report and Written Opinion of PCT/US2013/031915 mailed on Jun. 3, 2013, 7 pages.
International Search Report of PCT/KR2007/003521 mailed on Oct. 23, 2007.
International Search Report of PCT/IB2003/005737 mailed on Mar. 3, 2004.
Jensen, Craig, "Fragmentation: the condition, the cause, the cure" Online!, Executive Software International, 1994; ISBN: 0964004909; Retrieved from Internet: <URL: www.executive.com/fragbook/fragbook.htm> Chapter: "How a disk works", Section: "The original problem". Retrieved on Jan. 9, 2014.
Extended European Search Report for EP 12825080 mailed Sep. 11, 2014, 10 pages.
Extended European Search Report for EP 12825521 mailed Nov. 24, 2014, 7 pages.
U.S. Appl. No. 14/095,860, filed Dec. 3, 2013 Non-Final Office Action mailed Dec. 26, 2014, 45 pages.
U.S. Appl. No. 14/043,617, filed Oct. 1, 2013 Non-Final Office Action mailed Jan. 5, 2014, 45 pages.
U.S. Appl. No. 13/856,752, filed Apr. 4, 2013 Non Final Office Action mailed Nov. 5, 2014, 34 pages.
U.S. Appl. No. 13/829,350, filed Mar. 14, 2013 Final Office Action mailed Jan. 23, 2015, 18 pages.
U.S. Appl. No. 13/799,653, filed Mar. 13, 2013 Notice of Allowance mailed Nov. 26, 2014, 32 pages.
U.S. Appl. No. 13/799,604, filed Mar. 13, 2013, Final Office Action mailed Jan. 14, 2015, 36 pages.
U.S. Appl. No. 13/797,173, filed Mar. 12, 2013 Notice of Allowance mailed Nov. 24, 2015, 37 pages.
U.S. Appl. No. 13/757,168, filed Feb. 1, 2013 Notice of Allowance mailed Oct. 14, 2015, 28 pages.
U.S. Appl. No. 13/294,005, filed Nov. 11, 2013 Notice of Allowance mailed Oct. 31, 2014, 24 pages.
U.S. Appl. No. 13/292,047, filed Nov. 8, 2013 Final Office Action mailed Jan. 13, 2015, 22 pages.
U.S. Appl. No. 13/215,598, filed Aug. 23, 2013 Non-Final Office Action mailed Nov. 25, 2014, 18 pages.
U.S. Appl. No. 13/786,915, filed Mar. 6, 2013 Non Final Rejection mailed Oct. 15, 2015, 59 pages.
U.S. Appl. No. 14/095,860, filed Dec. 3, 2013 Notice of Allowance mailed Oct. 19, 2015, 14 pages.
U.S. Appl. No. 14/338,114, filed Jul. 22, 2014 Non-Final Office Action mailed Sep. 30, 2015, all pages.
U.S. Appl. No. 14/529,989, filed Oct. 31, 2014 Non-Final Office Action mailed Nov. 4, 2015, all pages.
U.S. Appl. No. 14/043,617, filed Oct. 1, 2013 Non-Final Office Action mailed Oct. 23, 2015, all pages.
U.S. Appl. No. 14/676,137, filed Apr. 1, 2015 Notice of Allowance mailed Sep. 28, 2015, 35 pages.
Supplementary European Search Report for EP 13760902 mailed Oct. 20, 2015, all pages.
Supplementary European Search Report for EP 13761427 mailed Oct. 19, 2015, all pages.
Office Action dated Jul. 31, 2015 for Mexican Patent Application No. MX/a/2014/009919, 2 pages.
U.S. Appl. No. 14/340,190, filed Jul. 24, 2014, Final Rejection mailed Feb. 19, 2016, 54 pages.
U.S. Appl. No. 14/154,887, filed Jan. 14, 2014 Notice of Allowance mailed Jan. 21, 2016, 26 pages.
U.S. Appl. No. 13/288,002, filed Nov. 2, 2011 Final Rejection mailed Jan. 13, 2016, 22 pages.
U.S. Appl. No. 13/292,047, filed Nov. 8, 2011 Notice of Allowance mailed Jan. 29, 2016, 45 pages.
U.S. Appl. No. 13/215,598, filed Aug 23, 2011 Non Final Office Action mailed Dec. 15, 2015, all pages.

(56) References Cited

OTHER PUBLICATIONS

U.S. Appl. No. 13/801,968, filed Mar. 13, 2013 Final Office Action mailed Nov. 19, 2015, all pages.
U.S. Appl. No. 14/589,090, Notice of Allowance mailed Feb. 9, 2016, 47 pages.
U.S. Appl. No. 14/591,549, Non Final Office Action mailed Dec. 31, 2015, 19 pages.
U.S. Appl. No. 14/338,114, filed Jul. 22, 2014 Notice of Allowance mailed Feb. 3, 2016, all pages.
Second Office Action for CN 201280031434.7, issued Dec. 23, 2015, 6 pages.
First Office Action issued by State Intellectual Property Office (SIPO) for CN 201280028697.2, issued Dec. 16, 2015, 11 pages.
Notice of Allowance received for Mexican Patent Appln. MX/a/2013/014991, mailed on Dec. 9, 2015, 1 page.
Notice of Allowance mailed Dec. 4, 2015 for Mexican Patent Application No. MX/a/2014/009723, 1 page.
International Search Report and Written Opinion of PCT/US2015/065934 mailed Apr. 8, 2016, all pages.
International Search Report and Written Opinion of PCT/EP2015/073937 mailed Apr. 15, 2016, all pages.
Office Action for EP 13 192 169.4 dated Mar. 29, 2016, all pages.
U.S. Appl. No. 13/786,915, filed Mar. 6, 2013 Final Rejection mailed May 12, 2016, 27 pages.
U.S. Appl. No. 13/786,915, filed Mar. 6, 2013 Notice of Allowance mailed Jul. 19, 2016, all pages.
U.S. Appl. No. 14/757,606, filed Dec. 23, 2015 Non Final Rejection mailed Mar. 24, 2016, 33 pages.
U.S. Appl. No. 13/786,915, filed Dec. 23, 2015, Notice of Allowance mailed Jul. 18, 2016, all pages.
U.S. Appl. No. 13/215,598, filed Aug. 23, 2011 Notice of Allowance mailed May 24, 2016, all pages.
U.S. Appl. No. 13/801,968, filed Mar. 13, 2013 Notice of Allowance mailed Apr. 27, 2016, 33 pages.
U.S. Appl. No. 14/591,549, Final Office Action mailed Jun. 30, 2016, all pages.
U.S. Appl. No. 14/529,989, filed Oct. 31, 2014 Final Rejection mailed May 6, 2016, 27 pages.
U.S. Appl. No. 14/043,617, filed Oct. 1, 2013 Final Office Action mailed May 6, 2016, 56 pages.
Office Action for European Application No. 12825147 dated Mar. 7, 2016, all pages.
Decision to Grant from the State Intellectual Property Office (SIPO) for CN 201280031434.7, issued May 12, 2016, all pages. (in Chinese language).
Notice of Allowance dated Jan. 15, 2016 for Mexican Patent Application No. MX/a/2014/009928, 1 page.
Notice of Allowance dated Jun. 3, 2016 for Mexican Patent Application No. MX/a/2015/009985, 1 page.
Notice of Allowance dated Jun. 6, 2016 for Mexican Patent Application No. MX/a/2015/015383, 1 page.
Notice of Allowance dated Dec. 16, 2015 for Mexican Patent Application No. MX/a/2014/009919 1 page.
Author Unknown, "Digital Video Broadcasting (DVB); Specification for Service Information (SI) in DVB systems," ETSI EN 300 468 V1.1 (Jan. 2013), 172 pages.
Author Unknown, Digital Video Broadcasting (DVB); Content Protection and Copy Management (DVB-CPCM); Part 3: CPCM Usage State Information; European Broadcasting Union Union Europa de Radio-Television, ETSI TS 102 825-3 V1.1.1 (Jul. 2008), XP014042034, 28 pages.
First Office Action and Search Report from the State Intellectual Property Office (SIPO) for CN 201280031150.8, issued Aug. 3, 2016, 10 pages.
First Office Action and Search Report for CN Appln No. 201280030476.9 issued Aug. 9, 2016, all pages.

\* cited by examiner

DYNAMIC TUNER ALLOCATION

CROSS-REFERENCE TO RELATED APPLICATION

This application claims the benefit of U.S. Provisional Patent Application No. 61/611,483, filed 15 Mar. 2012, entitled "RECEPTION, RECORDING, STORAGE, AND MANIPULATION OF MULTIPLE TELEVISION CHANNELS," the entirety of which is hereby incorporated by reference for all intents and purposes.

BACKGROUND

The advent of the DVR (Digital Video Recorder) and the availability of high-capacity and affordable computer-readable storage devices have made available many possibilities to television programming service providers and viewers alike. In recent years, television viewers have come to expect the ability to customize and manage the recording of television programming via their television receivers.

SUMMARY

This Summary does not in any way limit the scope of the claimed subject matter.

In an aspect, a computer-implemented method is disclosed. The method may include determining a current status of each one of a plurality of tuners of a television receiver in response to receiving a request to allocate a tuner of the television receiver for the recording of a particular broadcast program. The method may include assigning a ranking to each one of the plurality of tuners based on an associated determined status. The method may include generating a listing based on the ranking, wherein when selected a particular tuner of ranking greater than each of other ones of the plurality of tuners is allocated for the recording of the particular broadcast program.

In an aspect, a system including one or more processors and a memory communicatively coupled with and readable by the one or more processors is disclosed. The memory may have stored therein processor-readable instructions which, when executed by the one or more processors, cause the one or more processors to determine a current status of each one of a plurality of tuners of a television receiver based on a request to allocate a tuner of the television receiver for the recording of a particular broadcast program. The memory may have stored therein processor-readable instructions which, when executed by the one or more processors, cause the one or more processors to assign a ranking to each one of the plurality of tuners based on an associated determined status. The memory may have stored therein processor-readable instructions which, when executed by the one or more processors, cause the one or more processors to generate a listing based on the ranking, wherein when selected a particular tuner of ranking greater than each of other ones of the plurality of tuners is allocated for the recording of the particular broadcast program.

In an aspect, a non-transitory processor-readable medium comprising processor-readable instructions is disclosed. The processor-readable instructions may be configured to cause one or more processors to, based on a request to allocate a tuner of a television receiver for the recording of a particular broadcast program, determine a current status of each one of a plurality of tuners of the television receiver. The processor-readable instructions may be configured to cause one or more processors to assign a ranking to each one of the plurality of tuners based on an associated determined status. The processor-readable instructions may be configured to cause one or more processors to generate a listing based on the ranking, wherein when selected a particular tuner of ranking greater than each of other ones of the plurality of tuners is allocated for the recording of the particular broadcast program.

DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
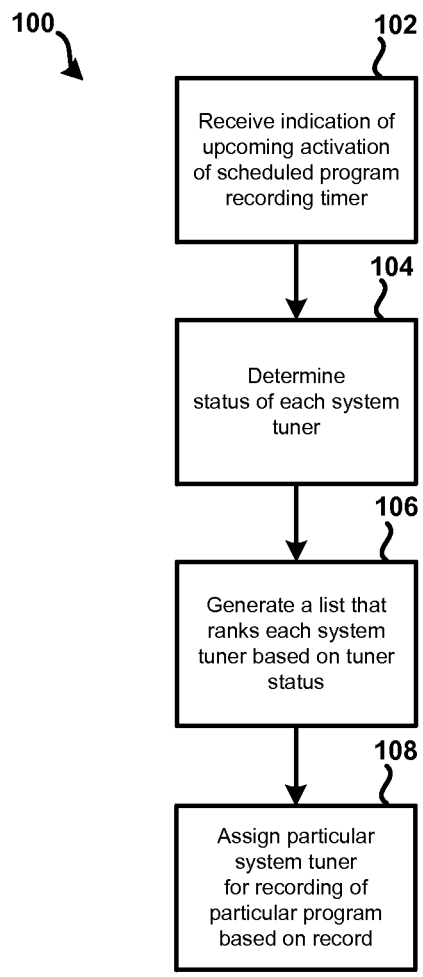
FIG. 1 shows an example method for selecting a particular tuner of a television receiver, from among a plurality of tuners, to be used for the recording of particular broadcast programming.

The present disclosure is directed to or towards the automated selection of a particular television receiver tuner that is to be used for the recording of particular media content. Although described in the context of a satellite-based content distribution system, the various aspects of the present disclosure may generally be applicable to any scenario in which it is desirable to maximize or optimize the allocation of computing system or device resources. For example, referring now to FIG. 1, an example method 100 is shown for selecting a particular tuner of a television receiver, from among a plurality of tuners, to be used for the recording of particular broadcast programming. The example method 100 as described may be performed on or by a computing system or device, such as a television receiver. An example of such a computing system or device is discussed below in connection with at least FIG. 7.

The method 100 may include receiving (module 102), by the television receiver, an indication of an upcoming or imminent activation of a scheduled program recording timer. For example, the television receiver may receive a warning signal at a particular time prior to activation of the recording timer. The particular time may be predetermined and configurable. For example, the television receiver may receive the warning signal at time of 0.5 seconds, or 2 seconds, or 5 seconds, or 10 seconds, etc., prior to activation of the recording timer. In general, the recording timer may be defined or configured to implement, upon activation, a recording of particular broadcast programming at a predetermined date and time. For example, the timer may be configured to instantiate the recording of a "Show S1" that is scheduled to appear on a channel "2012" during a particular time period "9-10 PM" of a particular day (see e.g., FIG. 3 and description). Other embodiments are possible.

The method 100 may further include determining (module 104), by the television receiver in response to receiving the indication, a current status of each of the plurality of tuners of the television receiver. In general, each of the plurality of tuners may be in one of an inactive state and an active state. A tuner in an inactive state may, for example, refer to a tuner that is not currently in-use. A current status of an inactive tuner may be defined as "inactive." A tuner in an active state may, for example, refer to a tuner that is currently being used for recording, but will be no longer be recording at a "start" time associated with the recording timer and thus may be available for recording of the particular broadcast programming. A current status of an active tuner in this scenario may be defined as "active; recording; assignable." In another example, a tuner in an active state may, for example, refer to a tuner that is currently being used to select particular live programming for presentation by a display device. A current status of an active tuner in this scenario may be defined as "active; live." Other embodiments are possible.

An example sequence of steps to resolve or determine a current status of each of a plurality of tuners of a television receiver is described in further detail below in connection with FIGS. 5-6. Further, the resolution or accuracy of "current" tuner status may generally be a function of the timing of the indication (module 102). For example, determining "current" tuner status within 45 seconds prior to activation of a recording timer may result in a more accurate result than determining "current" tuner status within 60 seconds prior to activation of the recording timer.

The method 100 may further include generating (module 106), by the television receiver upon determining a current status of each of the plurality of tuners, a listing that ranks each of the plurality of tuners against each other based on respective "current" status. For example, the "active; recording; assignable" tuner status may be predefined as having a ranking or priority greater than the "active; live" tuner status, which in turn may be predefined as having a ranking or priority greater than the "inactive" tuner status. In this example, a particular tuner "Tuner A" having an "active; recording; assignable" tuner status may be specified within the listing ahead of a particular tuner "Tuner B" having an "active; live" tuner status, and ahead of a particular tuner "Tuner C" having an "inactive" tuner status. Here, an ordered set of tuners within the listing may be itemized as "Rank 1: Tuner A; Rank 2: Tuner B; Rank 3: Tuner C." Other embodiments are possible.

The method 100 may further include allocating (module 108), by the television receiver based on the listing, a particular tuner for recording of the particular broadcast programming at or near the particular date and time. As discussed in further detail below, the television receiver may use or utilize the listing to determine an "optimal" tuner for recording of the particular broadcast programming, and then allocate the optimal tuner for recording of the particular broadcast programming. An optimal tuner may be defined as a tuner having a "higher" or "greater" ranking within the listing than other ones of the plurality tuners.

Such an implementation may be beneficial in many respects. For example, in some DVR-related systems, it may be possible to create a timer using a user-designated tuner to record particular programming. For example, a first user may create a recording timer to initiate recording of a particular program at 9 PM of a particular day using a particular tuner. In this example, however, it may be possible that the particular tuner is in-use at 9 PM of the particular day. For example, a second user may be watching a program using the particular tuner, which in general may be transparent to both the first and second users. Here, assuming that the particular tuner is forcibly allocated by direction of the particular timer, the viewing experience of the second user may be unnecessarily interrupted. The systems and method of the present disclosure may be configured to prevent such an unnecessary interruption by determining a more "optimal" tuner for recording of the programming.

Further scenarios and beneficial aspects associated with selecting a particular tuner of a television receiver in accordance with the present disclosure may be understood in light of the following description in connection with FIGS. 2-7.

Figure 2:
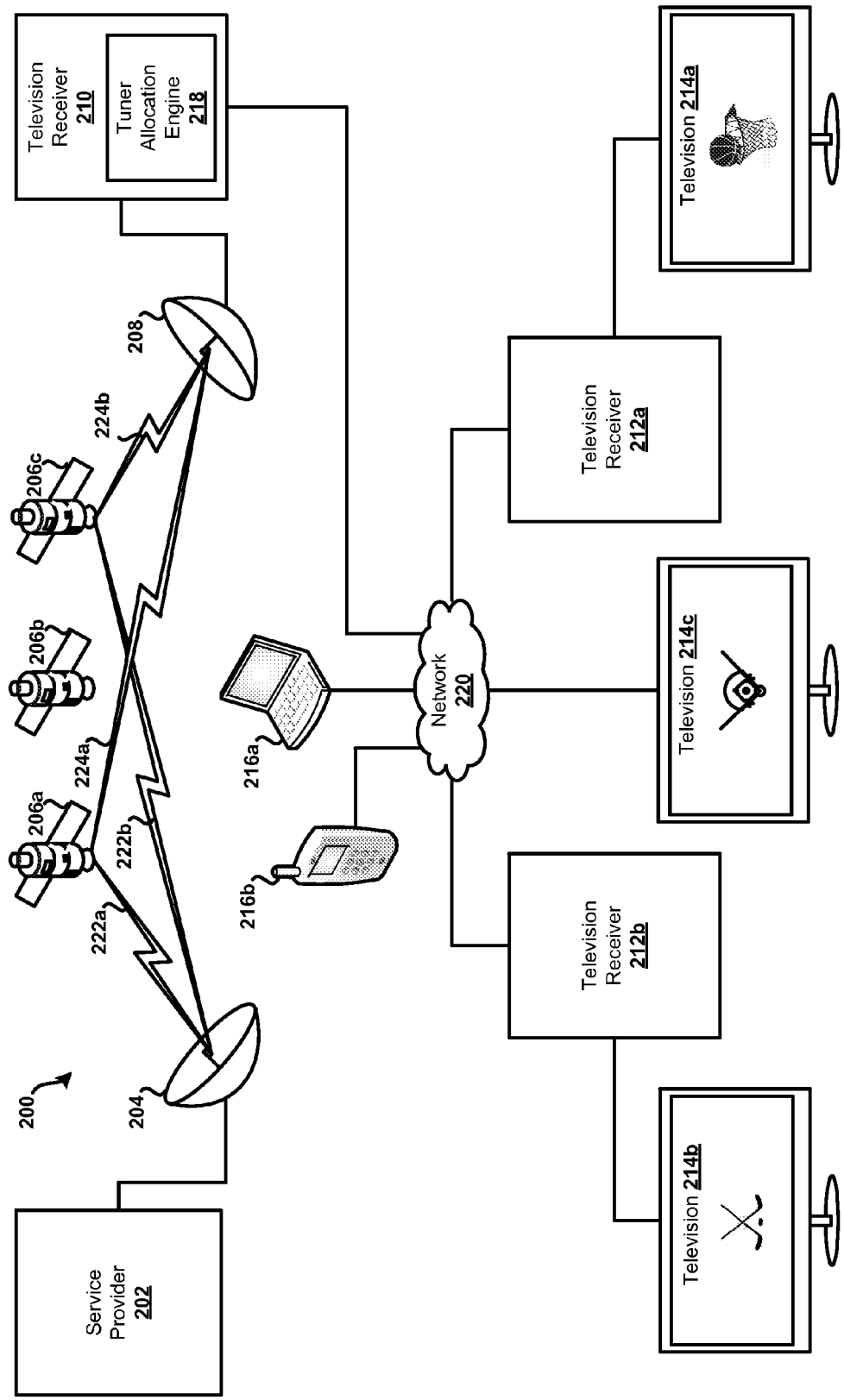
FIG. 2 shows an example media content distribution system in which aspects of the present disclosure may be implemented.

For example, referring now to FIG. 2 an example media content distribution system 200 is shown in which aspects of the present disclosure may be implemented. For brevity, the system 200 is depicted in a simplified and conceptual form, and may generally include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of media or content distribution system.

The example system 200 may include a service provider 202, a satellite uplink 204, a plurality of orbiting (e.g., geosynchronous) satellites 206a-c, a satellite dish 208, a PTR (Primary Television Receiver) 210, a plurality of secondary television receivers 212a-b, a plurality of televisions 214a-c, and a plurality of computing devices 216a-b. In the present example, the PTR 210 may at least include a tuner allocation engine 218. The tuner allocation engine 218 may in one aspect be configured for selecting a particular tuner of the PTR 210 for recording particular programming in accordance with the present disclosure, as discussed further below.

The system 200 may also include at least one network 220 that establishes a bi-directional communication path for data transfer between and among the PTR 210, secondary television receivers 212a-b, televisions 214a-c, and computing devices 216a-b of the example system 200. In some embodiments, the network 220 may further establish a bi-directional communication path (not shown) for data transfer between the PTR 210 and the service provider 202. The network 220 is intended to represent any number of terrestrial and/or non-terrestrial network features or elements. For example, the network 220 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the example system 200.

The PTR 210, and the secondary television receivers 212a-b, as described throughout may generally be any type of television receiver, such as a STB (Set-Top-Box) for example. In another example, the PTR 210, and the secondary television receivers 212a-b, may exhibit functionality integrated as part of or into a television, a DVR, a computer such as a tablet computing device, or any other computing system or device, as well as variations thereof. Further, the PTR 210 and the network 220, together with the secondary television receivers 212a-b, televisions 214a-c, and computing devices 216a-b, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc.

In practice, the satellites 206a-c may be configured to receive uplink signals 222a-b from the satellite uplink 204. In this example, the uplink signals 222a-b may contain one or more transponder streams of particular data or content, such as particular television channel, that is supplied by the service provider 202. For example, each of the respective uplink signals 222a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c. Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc.

The satellites 206a-c may further be configured to relay the uplink signals 222a-b to the satellite dish 208 as downlink signals 224a-b. Similar to the uplink signals 222a-b, each of the downlink signals 224a-b may contain one or more transponder streams of particular data or content, such as various encoded and/or at least partially electronically scrambled television channels, on-demand programming, etc., in accordance with an allotted carrier frequency and bandwidth. The downlink signals 224a-b, however, may not necessarily contain the same or similar content as a corresponding one of the uplink signals 222a-b. For example, the uplink signal 222a may include a first transponder stream containing at least a first group or grouping of television channels, and the downlink signal 224a may include a second transponder stream containing at least a second, different group or grouping of television channels. In other examples, the first and second group of television channels may have one or more television channels in common. In sum, there may be varying degrees of correlation between the uplink signals 222a-b and the downlink signals 224a-b, both in terms of content and underlying characteristics.

Continuing with the example implementation scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 224a-b, from one or more of the satellites 206a-c. Based on the characteristics of the PTR 210 and/or satellite dish 208, however, it may only be possible to capture transponder streams from a limited number of transponders concurrently. For example, a tuner of the PTR 210 may only be able to tune to a single transponder stream from a transponder of a single satellite, such as satellite 206a, at a time.

Additionally, the PTR 210, which is communicatively coupled to the satellite dish 208, may subsequently select via tuner (see e.g., FIG. 4), decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented "live," or from a recording as previously stored on, by, or at the PTR 210. In this example, the HD channel may be output to the television 214c in accordance with the HDMI/HDCP content protection technologies. Other embodiments are possible. For example, in some embodiments, the HD channel may be output to the television 214c in accordance with the MoCA® (Multimedia over Coax Alliance) home entertainment networking standard.

Further, the PTR 210 may select via tuner, decode, and relay particular transponder streams to one or both of the secondary television receivers 212a-b, which may in turn relay particular transponder streams to a corresponding one of the television 214a and the television 214a for display thereon. For example, the satellite dish 208 and the PTR 210 may, respectively, be configured to receive, decode, and relay at least one television channel to the television 214a by way of the secondary television receiver 212a. Similar to the above-example, the television channel may generally be presented "live," or from a recording as previously stored on the PTR 210, and may be output to the television 214a by way of the secondary television receiver 212a in accordance with a particular content protection technology and/or networking standard. Other embodiments are possible.

Still further, the satellite dish 208 and the PTR 210 may, respectively, be configured to receive, decode, and relay at least one premium television channel to one or both of the computing devices 216a-b. Similar to the above-examples, the television channel may generally be presented "live," or from a recording as previously stored on the PTR 210, and may be output to one or both of the computing devices 216a-b in accordance with a particular content protection technology and/or networking standard. Other embodiments are possible.

Figure 3:
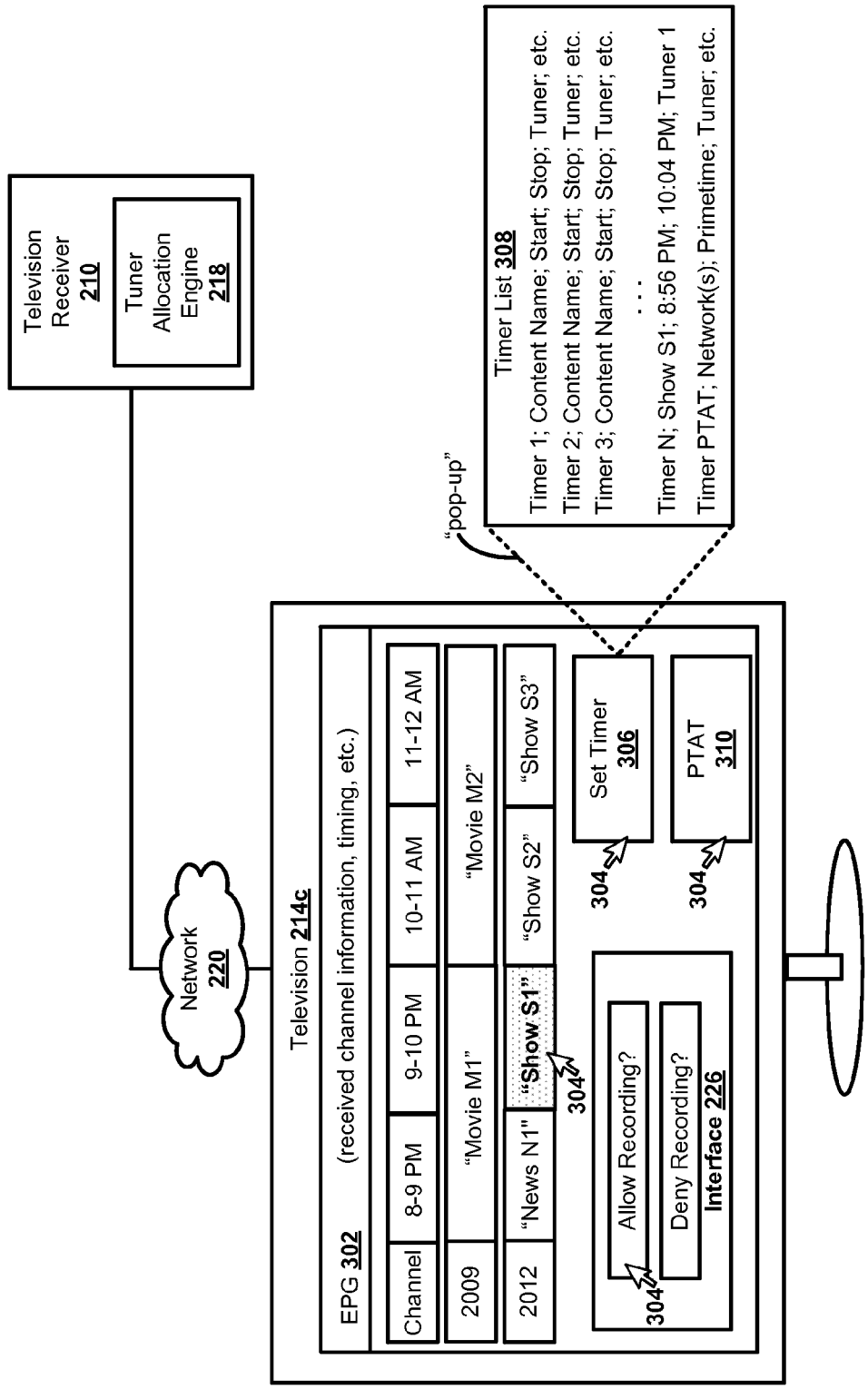
FIG. 3 shows aspects of the example system of FIG. 2 in further detail.

Referring now to FIG. 3, aspects of the example system 200 of FIG. 2 are shown in further detail. In particular, the PTR 210 may be configured to output an EPG (Electronic Programming Guide) 302 to and for presentation by at least the television 214c. The EPG 302 may at least present various information related to television channels and the timing of programs or programming appearing on such television channels, such as television channels as received from one or more of the satellites 206a-c. For example, the EPG 302 may display channel information associated with a channel "2012," where a "Show S1" is listed as scheduled to appear on the channel "2012" during a particular time period "9-10 PM" of a particular day, etc. In this example, and assuming that a current time is sometime during the time period "9-10 PM," a user may manipulate a cursor 304 using a pointing device (not shown) to select the "Show S1" for immediate viewing on the television 214c.

The EPG 302 may further display or otherwise present a first user-selectable icon 306 (e.g., "Set Timer" icon) that may be selected to set a recording timer to automatically record a particular program for later viewing. In this example, the PTR 210 may exhibit DVR functionality to record programs or programming appearing on various channels as received from satellites 206a-c. For example, and assuming that a current time is sometime prior the time period "9-10 PM," such as a current time within the time period "8-9 PM" preceding the "9-10 PM" time period, a user may manipulate the cursor 304 to select the "Show S1" as displayed within the EPG 302 for recording by the PTR 210 for later viewing one or more of the televisions 214a-c and the computing devices 216a-b.

For example, during or within the time period "8-9 PM" and following "selection" of the "Show S1," as shown by stipple shading in FIG. 3, a user may manipulate the cursor 304 to select the icon 306 to set a particular "Timer N" to automatically record the "Show S1" for later viewing. In this example, the "Timer N," where N is a non-zero integer value, is shown within a timer list 308 that may, in some embodiments, be presented within the EPG 302 (e.g., fully or at least partially superimposed over EPG 302) in response to selection of the icon 306. In general, the timer list 308 may itemize or include an inventory of all "currently" or "presently" enabled program timers, along with particular information associated with each enabled program timer.

For example, the particular information may include a "Content Name" parameter, a recording "Start" time parameter, a recording "Stop" time parameter, and other parameters as desired. For example, in some embodiments, the information may include a "Tuner" parameter that designates a particular tuner that is to be used to "tune" to the "Show S1," such that the "Show S1" may be recorded for later viewing. In one embodiment, the "Tuner" parameter may be manually set by a user. For example, and as shown within the timer list 308 of FIG. 3, a "Tuner 1" may have been manually set by a user upon creation of the "Timer N." However, other embodiments are possible. For example, in some embodiments, the "Tuner 1" may be a "default" tuner automatically set by the PTR 210 upon creation of the "Timer N." Still other embodiments are possible.

As may be understood based upon the preceding description, a television viewer, sometimes referred to as a user, may use a stand-alone or integrated DVR, such as the PTR 210, to record individual broadcast television programming for viewing at a later time. A user may further may use the PTR 210 to record multiple instances of broadcast television programming, such as during television "Prime Time," or "Primetime," which may for example be between or from 8-10 PM, 7-9 PM, 7-10 PM, etc., on any particular day. The recording of a television channel for such a period of time may be defined by a television service provider, such as the service provider 202 shown in FIG. 2. During this period of time, at which the television channel is recorded, multiple television programs may be broadcast on the television channel. For example, sitcoms may tend to be scheduled for thirty minutes, including commercials, and dramas may tend to be scheduled for an hour including commercials. Recording of a television channel, such as during primetime, for multiple hours may result in two or more, possibly six, television programs being recorded.

In some scenarios, rather than a single television channel being recorded at a given time, multiple, such as four, television channels may be recorded over a given time period. For example, during weekday primetime hours, all of the major networks may be simultaneously recorded for the same period of time. Such recording may permit a user to view at a later time any television program that was broadcast during primetime on one of the major networks. When multiple television channels are recorded simultaneously, it may be efficient to use a single tuner to receive all of the multiple television channels being recorded. This may allow other tuners of the television receiver to be used for other operations such as, for example, recording of other television channels and/or presentation of television channels to a user via a viewing device, such as a television.

To implement such functionality, the EPG 302 may further display or otherwise present a second user-selectable icon 310 (e.g., "PTAT" icon) that may be selected to set at least one recording timer to automatically record multiple instances of broadcast television programming, possibly over multiple channels, such as during television "primetime" which may for example be from 8-10 PM, 7-9 PM, 7-10 PM, etc. In this example, a user may manipulate the cursor 304 to select the icon 310 to set a particular "Timer PTAT" to automatically record television "primetime" for later viewing on one or more of the televisions 214a-c and the computing devices 216a-b. In some embodiments, the "Timer PTAT" may be included within the timer list 308 that may, in some embodiments, be presented within the EPG 302 in response to selection of the icon 306 and/or icon 310. Other embodiments are possible.

In general, the "Timer PTAT" when itemized within the timer list 308 may include particular information. Example information associated with the "Timer PTAT" may at least include a "Network(s)" parameter, a "Primetime" parameter, and a "Tuner" parameter. The "Network(s)" parameter may specify at least one network channel to record such as, for example, at least one NBC network channel, at least one ABC network channel, at least one CBS network channel, at least one FOX network channel, and etc. The "Primetime" parameter may specify a particular time period, and frequency, at which television programming appearing on the network channel(s) specified by the "Network(s)" parameter may be recorded, such as from 7 PM to 10 PM on the NBC, ABC, CBS, and FOX networks each weeknight. The "Tuner" parameter may designate a particular tuner that is to be used to "tune" to the television programming appearing on the network channel(s) specified by the "Network(s)" parameter such that the same may be recorded for later viewing. In one embodiment, the "Tuner" parameter may be manually set by a user. In other embodiments, the "Tuner" may be specify a "default" tuner automatically set by the PTR 210 upon creation of the "Timer PTAT."

As discussed in further detail below, the tuner allocation engine 218 may in one aspect be configured for, in response to an upcoming activation of a scheduled program recording timer that may be listed within the timer list 308, selecting a particular tuner of the PTR 210 in accordance with the present disclosure.

Figure 4:
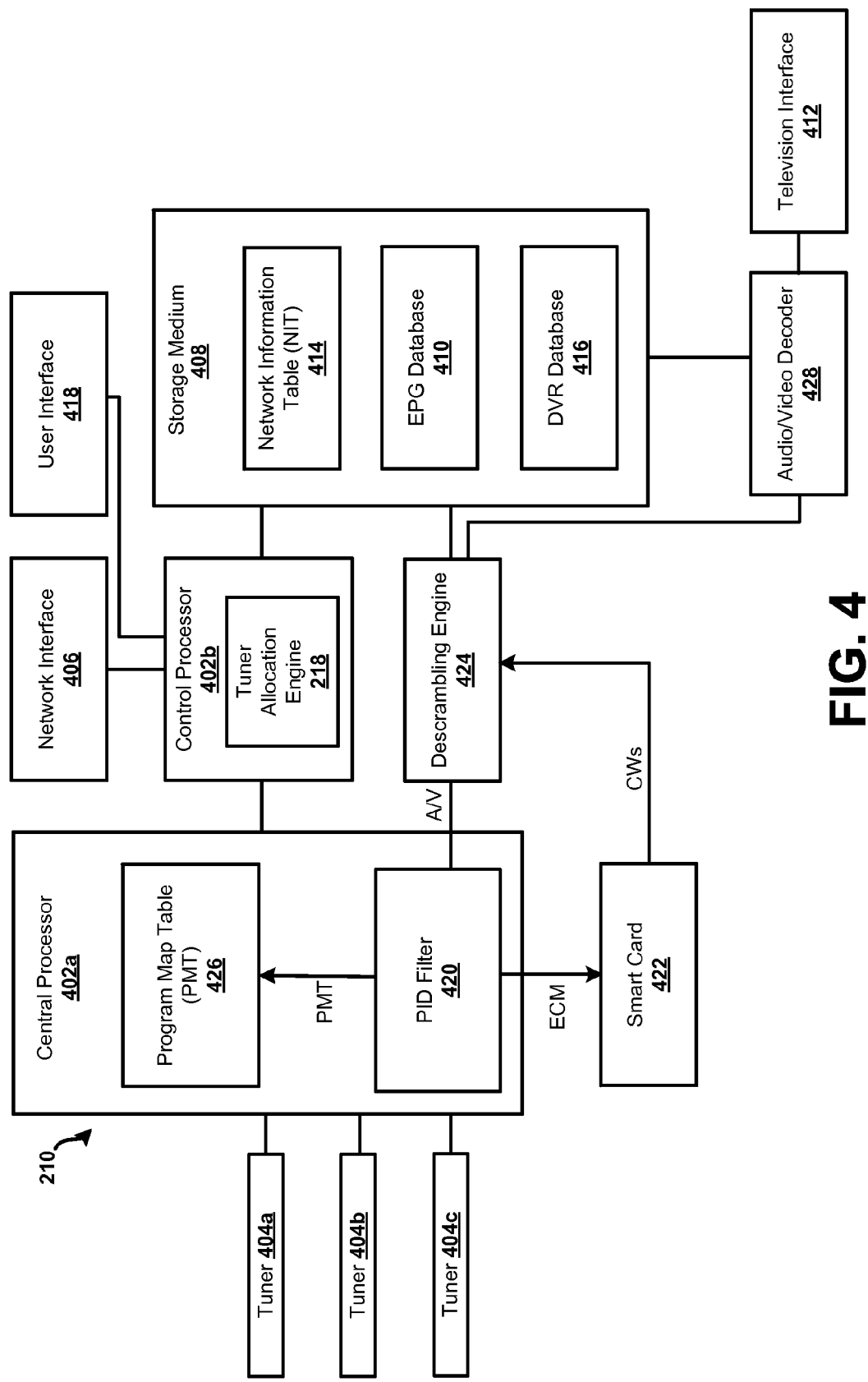
FIG. 4 shows a simplified block diagram of a primary television receiver of FIG. 2.

Referring now to FIG. 4, a simplified block diagram of the PTR 210 of FIG. 2 is shown in accordance with the present disclosure. In some embodiments, at least one of the secondary television receivers 212a-b may be configured in a manner similar to that of the PTR 210. In other embodiments, at least one of the secondary television receivers 212a-b may be configured to exhibit a reduced functionality as compared to the PTR 210, and may depend at least to a certain degree on the PTR 210 to implement certain features or functionality. In this example, the secondary television receivers 212a-b may be referred to as a "thin client."

For brevity, the PTR 210 is depicted in a simplified and conceptual form, and may generally include more or fewer elements or components as desired in accordance with the present disclosure. For example, the PTR 210 is shown in FIG. 4 to include the tuner allocation engine 218 as mentioned above in connection with FIG. 2. Additionally, although not explicitly shown in FIG. 4, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such a functionality. Additionally, the PTR 210 may be configured to include any number of other various components or logical modules that are implemented in hardware, software, firmware, or any combination thereof, and such components or logical modules may or may not be implementation-specific.

In some embodiments, the PTR 210 and/or the secondary television receivers 212a-b comprise of a STB. In addition to being in the form of an STB, at least the PTR 210 may be incorporated into another device, such as the television 214c. For example, the television 214c may have an integrated television receiver that does not involve an external STB being coupled with the television 214c. A STB may contain some or all of the components of the PTR 210 and/or may be able to perform some or all of the functions of the PTR 210. Accordingly, instances in this document referring to a STB, and steps being performed by a STB, may also be performed, more generally, by the PTR 210 and/or secondary television receivers 212a-b.

Referring still to FIG. 4, the PTR 210 may be configured to record omnibus channel files and extract a television program from a recorded omnibus channel file, and my include the tuner allocation engine 218 as shown in FIG. 2, at least one processor 402, including a central processor 402a and a control processor 402b, a plurality of tuners 404a-c, at least one network interface 406, at least one non-transitory computer-readable storage medium 408, at least one EPG database 410, at least one television interface 412, at least one NIT (Networking Information Table) 414, at least one DVR database 416, at least one user interface 418, at least one PID filter 420, at least one smart card 422, at least one descrambling engine 424, at least one PMT (Program Map Table) 426, and at least one decoder 428. In other embodiments of the PTR 210, fewer or greater numbers of components may be present. Further, functionality of one or more components may be combined; for example, functions of the descrambling engine 424 may be performed by the central processor 402a. Still further, functionality of components may be spread among additional components. For example, the PID filter 420 may be handled by hardware and/or software separate from the PMT 426.

The processor 402 may include one or more specialized and/or general-purpose processors configured to perform processes such as tuning to a particular channel, accessing and displaying EPG information from the EPG database 410, and/or receiving and processing input from a user. For example, processor 402 may include one or more processors dedicated to decoding video signals from a particular format, such as MPEG (Moving Picture Experts Group), for output and display on a television and for performing decryption.

The control processor 402b may communicate with the central processor 402a. The control processor 402b may control the recording of television channels based on timers stored in the DVR database 416. The control processor 402b may initiate recording of a television channel by sending a record command along with an indication of the television channel to be recorded to the central processor 402a. The control processor 402b may not send a second record command, when additional recording is to begin at the same time, until an acknowledgement that recording of the first television channel has successfully been received and initiated by the central processor 402a. The control processor 402b may also provide commands to the central processor 402a when recording of a television channel is to cease. In addition to providing commands relating to the recording of television channels, the control processor 402b may provide commands to the central processor 402a that indicate television channels to be output to the decoder 428 for output to a presentation device, such as the television 214c for example.

The control processor 402b may also communicate with the network interface 406 and the user interface 418. The control processor 402b may handle in-coming data from the network interface 406 and the user interface 418. Additionally, the control processor 402b may be configured to output data via the network interface 406.

The tuners 404a-c may be used to tune to television channels, such as television channels transmitted via satellite or cable, such as satellites 206a-c. Each respective one of the tuner 404a-c may be capable of receiving and processing a single stream of data from a satellite transponder, or a cable RF channel, at a given time. As such, a single tuner may tune to a single transponder or, for a cable network, a single cable RF channel. Additionally, one tuner (e.g., tuner 404a) may be used to tune to a television channel on a first transponder stream for display using a television, while another tuner (e.g., tuner 404b) may be used to tune to a television channel on a second transponder for recording and viewing at some other time. Still another tuner (e.g., tuner 404c) may be used to check various television channels to determine if they are available or not. If multiple television channels transmitted on the same transponder stream are desired, a particular tuner (e.g., tuner 404a) may be used to receive the signal containing the multiple television channels for presentation and/or recording. The tuners 404a-c may receive commands from the central processor 402a. Such commands may instruct the tuners 404a-c which frequencies are to be used for tuning.

The network interface 406 may be used to communicate via an alternate communication channel with a television service provider. For example, the primary communication channel may be via satellite, which may be unidirectional to the STB, and the alternate communication channel, which may be bidirectional, may be via a network, such as the Internet. The PTR 210 may be able to communicate with the service provider 202 of FIG. 2 via a network, such as the Internet. This communication may be bidirectional. For example, data may be transmitted from the PTR 210 to the service provider 202, and from the service provider 202 to the PTR 210. The network interface 406 may be configured to communicate via one or more networks, such as the Internet, to communicate with the service provider 202. Information may be transmitted and/or received via the network interface 406.

The storage medium 408 may represent a non-transitory computer-readable storage medium. The storage medium 408 may include memory and/or a hard drive. The storage medium 408 may be used to store information received from one or more satellites and/or information received via the network interface 406. The storage medium 408 may store information related to the EPG database 410, the NIT 414, and/or the DVR database 416. Recorded television programs may be stored using the storage medium 408. The storage medium 408 may be partitioned or otherwise divided such that predefined amounts of the storage medium 408 are devoted to storage of omnibus channel files and user-selected television programs.

The EPG database 410 may store information related to television channels and the timing of programs appearing on such television channels. The EPG database 410 may be stored using the storage medium 408, which may be a hard drive. Information from the EPG database 410 may be used to inform users of what television channels or programs are popular and/or provide recommendations to the user. Information from the EPG database 410 may provide the user with a visual interface (e.g., EPG 302) displayed by a television that allows a user to browse and select television channels and/or television programs for viewing and/or recording. Information used to populate the EPG database 410 may be received via the network interface 406 and/or via satellites, such as satellites 206a-c of FIG. 2 via the tuners 404a-c. For instance, updates to the EPG database 410 may be received periodically via satellite. The EPG database 410 may serve as an interface for a user to control DVR functions of the PTR 210, and/or to enable viewing and/or recording of multiple television channels simultaneously.

In addition to being used to provide users with information about scheduled programming, information from the EPG database 410 may be used to determine when television programs begin and end for the purposes of recording. For instance, when a channel-specific file is recorded that contains multiple television channels, the start and end of time of specific television programs within the channel-specific file may be based on the start and end times indicated in the EPG database 410. Other data may be stored within the EPG database 410 that may be useful in managing channel-specific files, such as series identifiers and episode identifiers, which may be used by a television service provider to identify particular television programs.

The decoder 428 may serve to convert encoded video and audio into a format suitable for output to a display device. For instance, the decoder 428 may receive MPEG video and audio from the storage medium 408, or the descrambling engine 424, to be output to a television. MPEG video and audio from the storage medium 224 may have been recorded to the DVR database 416 as part of a previously-recorded television program. The decoder 428 may convert the MPEG video and audio into a format appropriate to be displayed by a television or other form of display device and audio into a format appropriate to be output from speakers, respectively.

The television interface 412 may serve to output a signal to a television, or another form of display device, in a proper format for display of video and playback of audio. As such, the television interface 412 may output one or more television channels, stored television programming from the storage medium 408, such as television programs from the DVR database 416 and/or information from the EPG database 410 for example, to a television for presentation.

The NIT 414 may store information used by the PTR 210 to access various television channels. The NIT 414 may be stored using the storage medium 408. Information used to populate the NIT 414 may be received via satellite, or cable, via the tuners 404a-c and/or may be received via the network interface 406 from a service provider. As such, information present in the NIT 414 may be periodically updated. The NIT 414 may be locally-stored by the PTR 210 using the storage medium 408. Information that may be present in the NIT 414 may include, for example: television channel numbers, a satellite identifier, a frequency identifier, a transponder identifier, an ECM (Entitlement Control Message) PID (Packet Identifier), one or more audio PIDs, and a video PID. A second audio PID of a channel may correspond to a SAP (Second Audio Program) program, such as in another language. In some embodiments, the NIT 414 may be divided into additional tables. For example, rather than the specific audio PIDs and video PIDs being present in the NIT 414, a channel identifier may be present within NIT 414 which may be used to look up the audio PIDs and video PIDs in another table, such as the PMT 426. For example, the PMT 426 may store information on audio PIDs and video PIDs for television channels that are transmitted on a transponder frequency.

Table 1 provides a simplified example of the NIT 414 for several television channels. It should be understood that in other embodiments, many more television channels may be represented in the NIT 414. The NIT 414 may be at least periodically updated by a television service provider. As such, television channels may be reassigned to different satellites and/or transponders, and the PTR 210 may be able to handle this reassignment as long as the NIT 414 is updated.

TABLE 1

| Channel | Satellite | Transponder | ECM PID | PMT PID |
|---------|-----------|-------------|---------|---------|
| 4       | 1         | 2           | 27      | 1001    |
| 5       | 2         | 11          | 29      | 1002    |
| 7       | 2         | 3           | 31      | 1001    |
| 13      | 2         | 4           | 33      | 1004    |

Based on information in the NIT 414, it may be possible to determine the proper satellite and transponder to which to tune for a particular television channel. In some embodiments, the NIT 414 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 414. Additional information on how the NIT 414, as indicated in Table 1, may be used is provided in reference to FIG. 4. The same PID may be reused on different transponders.

A DVR may permit a television channel to be recorded for a period of time. DVR functionality of the PTR 210 may be managed by the control processor 402b. The control processor 402b may coordinate the television channel, start time, and stop time of when recording of a television channel is to occur. The DVR database 416 may store information related to the recording of television stations. The DVR database 416 may store timers that are used by the control processor 402b to determine when a television channel should be tuned to and its programs recorded to the DVR database 416. However, other embodiments are possible. For example, in some embodiments, the storage medium 408 may store timers. Timer files may be defined as a daily_schedule_db.dat file and a gloal_timer_db.dat file. In general, when a "new" timer is created, a "new" entry may be added into the daily_schedule_db.dat and gloal_timer_db.dat files, which may include all timer related information such as channel number, start time, duration, etc. Further, a limited amount of the storage medium 408 may be devoted to the DVR database 416. Timers may be set by a service provider and/or one or more users of the PTR 210.

DVR functionality of the control processor 402b may have multiple modes. For example, DVR functionality of the control processor 402b may be configured to record individual television programs selected by a user to the DVR database 416. Using the EPG database 410, a user may select a particular television program. Based on the date, time period, and television channel indicated by the EPG database 410, the control processor 402b may record the associated television program to the DVR database 416. In another example, the DVR database 416 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by a television service provider (e.g., service provider 202).

As an example of this second mode of DVR functionality, a television service provider may configure the PTR 210 to record television programming on multiple, predefined television channels for a predefined period of time, on predefined dates. For instance, a television service provider may configure the PTR 210 such that television programming may be recorded from 7 PM to 10 PM on the NBC, ABC, CBS, and FOX networks each weeknight. When a television program is selected for recording by a user and is also specified for recording by the television service provider, the user selection may serve as an indication to save the television program for an extended time, beyond the time which the predefined recording would otherwise be saved.

The user interface 418 may include a remote control, physically separate from PTR 210, and/or one or more buttons on the PTR 210 that allows a user to interact with the PTR 210. The user interface 418 may be used to select a television channel for viewing, view information from the EPG database 410, and/or program a timer stored to the DVR database 416 wherein the timer may be used to control the DVR functionality of the control processor 402b.

Referring back to tuners 404a-c, television channels received via satellite, or cable, may contain at least some scrambled data. Packets of audio and video may be scrambled to prevent unauthorized users, such as nonsubscribers, from receiving television programming without paying the television service provider. When one of the tuners 404a-c is receiving data from a particular transponder of a satellite, the transponder stream may be a series of data packets corresponding to multiple television channels. Each data packet may contain a PID, which, in combination with the NIT 414 and/or the PMT 426, can be determined to be associated with particular television channel. Particular data packets, referred to as ECMs may be periodically transmitted. ECMs may be associated with another PID and may be encrypted; the PTR 210 may use the smart card 422 to decrypt ECMs. Decryption of an ECM may only be possible when the user (e.g., PTR 210) has authorization to access the particular television channel associated with the ECM. When an ECM is determined to correspond to a television channel being stored and/or displayed, the ECM may be provided to the smart card 422 for decryption.

When the smart card 422 receives an encrypted ECM, the smart card 422 may decrypt the ECM to obtain some number of control words. In some embodiments, from each ECM received by the smart card 422, two control words are obtained. In some embodiments, when the smart card 422 receives an ECM, it compares the ECM to the previously received ECM. When the two ECMs match, the second ECM is not decrypted because the same control words would be obtained. In other embodiments, each ECM received by the smart card 422 is decrypted; however, when a second ECM matches a first ECM, the outputted control words will match; thus, effectively, the second ECM does not affect the control words output by the smart card 422. The smart card 422 may be permanently part of the PTR 210 or may be configured to be inserted and removed from PTR 210.

The central processor 402a may be in communication with the tuners 404a-c and the control processor 402b. The central processor 402a may be configured to receive commands from the control processor 402b. Such commands may indicate when to start/stop recording a television channel and/or when to start/stop causing a television channel to be output to a television. The central processor 402a may control the tuners 404a-c. The central processor 402a may provide commands to the tuners 404a-c that instruct the tuners which satellite, transponder, and/or frequency to tune to. From the tuners 404a-c, the central processor 402a may receive transponder streams of packetized data. As previously detailed, some or all of these packets may include a PID that identifies the content of the packet.

The central processor 402a may be configured to create at least one PID filter 420 that sorts packets received from the tuners 404a-c based on the PIDs. When a tuner is initially tuned to a particular frequency, such as a particular transponder of a satellite, a PID filter may be created based on a PID of PMT data. The PID of PMT data packets may be known because it is stored as part of the NIT 414. From the PMT data packets, the PMT 426 may be constructed by central processor 402a. Table 2 provides an exemplary extract of a PMT. The PMT 426 may be specific to a particular transponder. As such, when tuning to a different transponder occurs, a new PMT may be created for the different transponder.

TABLE 2

| Channel | Video PID | $1^{st}$ Audio PID | $2^{nd}$ Audio PID |
|---------|-----------|--------------------|---------------------|
| 4       | 1003      | 2383               | 2119                |
| 5       | 2993      | 2727               | 2728                |
| 7       | 9238      | 1233               | 0129                |
| 13      | 0012      | 9348               | —                   |

Accordingly, based on the information present in the PMT 426, the audio and video PIDs for specific television channels may be identified. A television channel may have multiple audio PIDs due to a second audio program, which may be in a different language.

It should be understood that the values provided in Table 2 are for example purposes only. Actual values may vary. Additional information or less information may also be stored in the PMT 426.

The PID filter 420 may be configured to filter data packets based on PIDs. In some embodiments, the PID filter 420 is created and executed by central processor 402a. In other embodiments, separate hardware may be used to create and execute multiple PID filters. Depending on a television channel selected for recording/viewing, a PID filter may be created to filter the video and audio packets associated with the television channel, based on the PID assignments present in the PMT 426. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 424 or the smart card 422; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 414, may be appropriately routed by the PID filter 420. At a given time, one or multiple PID filters may be executed by the central processor 402*a*.

The descrambling engine 424 may use the control words output by the smart card 422 in order to descramble video and/or audio corresponding to television channels for storage and/or presentation Video and/or audio data contained in the transponder data stream received by the tuners 404*a-c* may be scrambled. Video and/or audio data may be descrambled by descrambling engine 424 using a particular control word. Which control word output by the smart card 422 to be used for successful descrambling may be indicated by a scramble control identifier present within the data packet containing the scrambled video or audio. Descrambled video and/or audio may be output by the descrambling engine 424 to the storage medium 408 for storage in the DVR database 416 and/or to the decoder 428 for output to a television or other presentation equipment via the television interface 412.

For simplicity, the PTR 210 of FIG. 4 has been reduced to a block diagram; commonly known parts, such as a power supply, have been omitted. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules. Further, the components of the PTR 210 may be part of another device, such as built into a television. Also, while the PTR 210 may be used to receive, store, and present television channels received via a satellite, it should be understood that similar components may be used to receive, store, and present television channels via a cable network.

Figure 5:
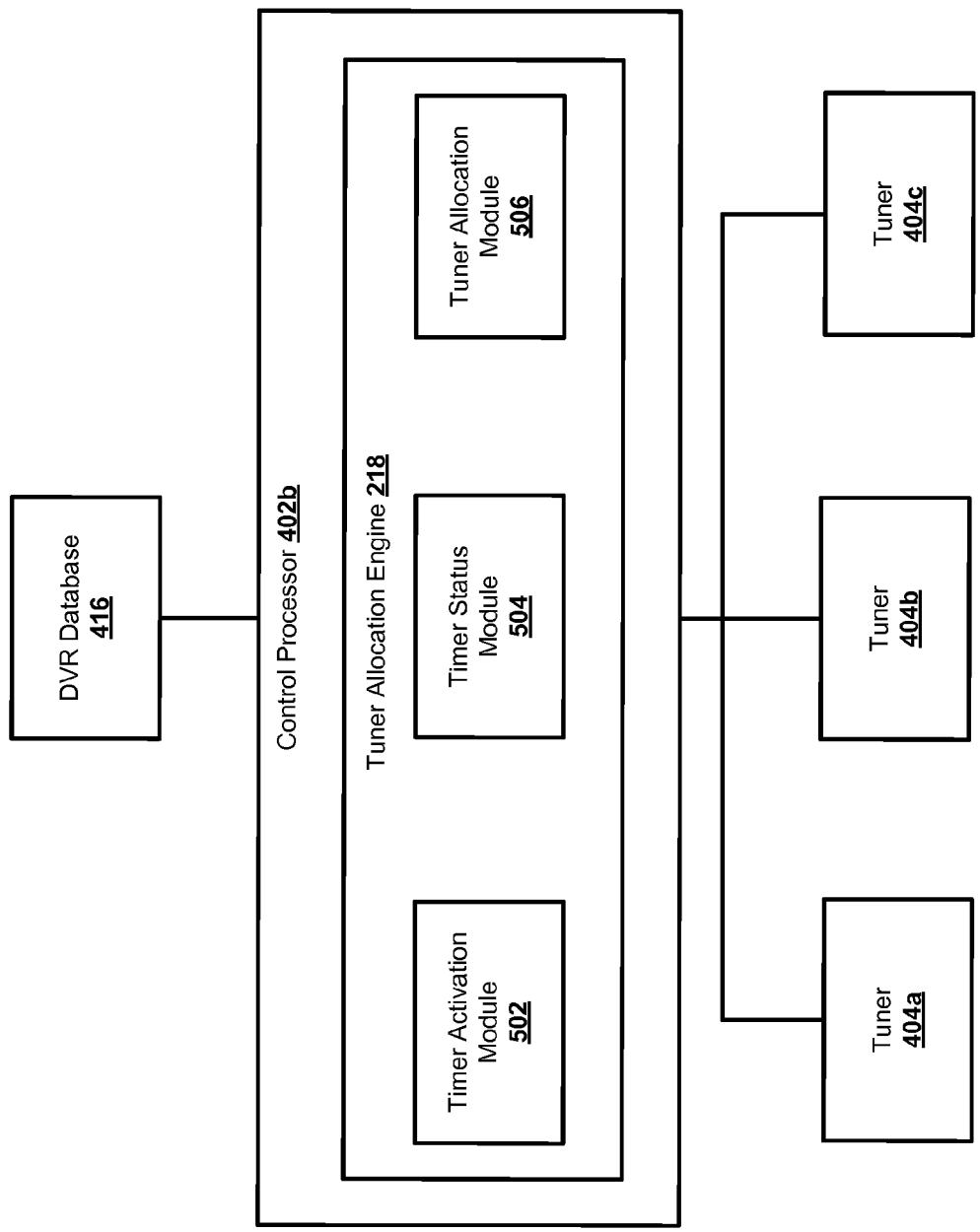
FIG. 5 shows a block diagram illustrating particular components of the primary television receiver of FIG. 4.

Referring now to FIG. 5, a block diagram is shown illustrating particular components of the PTR 210 of FIG. 4. More specifically, FIG. 5 shows the control processor 402*b*, including the tuner allocation engine 218, the tuners 404*a-c*, and the DVR database 416 of the PTR 210. In this example, the tuner allocation engine 218 may include a timer activation module 502, a timer status module 504, and a tuner allocation module 506. Other embodiments are possible. For example, in some embodiments, one or more respective components of the tuner allocation engine 218, or the tuner allocation engine 218 itself, may be wholly or at least partially located on one or more other components of the PTR 210, such as the central processor 402*a*. Further, in some embodiments, one or more respective components of the tuner allocation engine 218, or the tuner allocation engine 218 itself, may be wholly or at least partially located on one or more other components of the example system 200, such as the service provider 202, secondary television receivers 212*a-b*, etc.

In practice, the timer activation module 502 may be configured to receive, from the DVR database 416 for example, an indication of an upcoming or imminent activation of a scheduled program recording timer that is stored to the DVR database 416. As mentioned above, the DVR database 416 may store timers that are used by the control processor 402*b* to determine when a television channel should be tuned to and its programs recorded to the DVR database 416. Timing of the indication may be a user-configurable parameter. For example, the DVR database 416 and/or the control processor 402*b* may be configured to generate and transfer the indication to the timer activation module 502 at time of 10 seconds, or 20 seconds, or 30 seconds, or 45 seconds, etc., prior to activation of the scheduled program recording timer. Other embodiments are possible.

The timer activation module 502 may activate the timer status module 504 upon receiving the indication of upcoming activation of the scheduled program recording timer. In response, the timer status module 504 may query the control processor 402*b* to determine a current status of each of the tuners 404*a-c*, and generate a listing that ranks each of the tuners 404*a-c* against each other based on each respective current status. Each of the tuners 404*a-c* may generally be in one of an inactive state and an active state. When, for example, the tuner 404*a* is not currently in-use, the control processor 402*b* may indicate to the timer status module 504 a status of the tuner 404*a* of "inactive." When, for example, the tuner 404*b* is currently in-use, the control processor 402*b* may indicate to the timer status module 504 a status of the tuner 404*b* of "active." When a particular one of the tuners 404*a-c* is currently in an active state, the control processor 402*b* may further indicate to the timer status module 504 a "type" of status of the particular one of the tuners 404*a-c*, and whether or not information is available as to the anticipated status of the particular one of the tuners 404*a-c* at a "start" time associated with the scheduled program recording timer.

For example, the control processor 402*b* may indicate to the timer status module 504 that the tuner 404*c* is currently being used for the recording of particular programming, but will not be recording at a time of activation of the scheduled program recording timer. In this example, the tuner 404*c* is known to be currently recording, but will be available for the recording of particular broadcast programming associated with the scheduled program recording timer. The tuner 404*c* in this scenario may be considered an "optimal" tuner for recording of the particular broadcast programming, and may be assigned a "highest" or "greatest" ranking to quantify the tuner 404*c* as an "optimal" tuner. In one example, a current status of an active tuner in this scenario may be defined as "active; recording; assignable." Other embodiments are possible.

In another example, the control processor 402*b* may indicate to the timer status module 504 that the tuner 404*c* is currently being used for the recording of particular programming, but will not be recording at a time of activation of the scheduled program recording timer, and further that the tuner 404*c* is currently being used for a PIP (Picture in Picture) session. In this example, the tuner 404c is known to be currently recording, but will be available for recording of particular broadcast programming associated with the scheduled program recording timer, and further is being used for a PIP session. The tuner 404c in this scenario may not be considered an optimal tuner for recording of the particular broadcast programming, and may be assigned a ranking less than the highest or greatest ranking that would otherwise quantify the tuner 404c as an optimal tuner. In one example, a current status of an active tuner in this scenario may be defined as "active; recording; assignable; PIP." Other embodiments are possible.

In another example, the control processor 402b may indicate to the timer status module 504 that the tuner 404c is currently being used for the recording of particular programming, but will not be recording at a time of activation of the scheduled program recording timer, and further that the tuner 404c is currently being used to select the particular programming for presentation by a display device. In this example, the tuner 404c is known to be currently recording, but will be available for recording of particular broadcast programming associated with the scheduled program recording timer, and further is being used for "live" viewing of the particular programming that is being recorded. The tuner 404c in this scenario may not be considered an optimal tuner for recording of the particular broadcast programming, and may be assigned a ranking less than the highest or greatest ranking that would otherwise quantify the tuner 404c as an optimal tuner. In one example, a current status of an active tuner in this scenario may be defined as "active; recording; assignable; live." Other embodiments are possible.

In another example, the control processor 402b may indicate to the timer status module 504 that the tuner 404c is currently being used for "live" viewing of particular programming, and further is being used for a PIP session. The tuner 404c in this scenario may not be considered an optimal tuner for recording of the particular broadcast programming associated with the scheduled program recording timer, and may be assigned a ranking less than the highest or greatest ranking that would otherwise quantify the tuner 404c as an optimal tuner. In one example, a current status of an active tuner in this scenario may be defined as "active; live; PIP." Other embodiments are possible.

In another example, the control processor 402b may indicate to the timer status module 504 that the tuner 404c is currently being used for "live" viewing of particular programming. The tuner 404c in this scenario may not be considered an optimal tuner for recording of the particular broadcast programming associated with the scheduled program recording timer, and may be assigned a ranking less than the highest or greatest ranking that would otherwise quantify the tuner 404c as an optimal tuner. In one example, a current status of an active tuner in this scenario may be defined as "active; live." Other embodiments are possible.

In another example, the control processor 402b may indicate to the timer status module 504 that the tuner 404c is currently being used for "live" viewing of particular programming, and further is "delayed" some manner. In this example, the tuner 404c is currently being used for "live" viewing of particular programming, but a "trick" mode may be engaged by a user such as by activation of a "pause" function or "skip back" function so that the particular programming is time delayed. The tuner 404c in this scenario may not be considered an optimal tuner for recording of the particular broadcast programming associated with the scheduled program recording timer, and may be assigned a ranking less than the highest or greatest ranking that would otherwise quantify the tuner 404c as an optimal tuner. In one example, a current status of an active tuner in this scenario may be defined as "active; live; delayed." Other embodiments are possible.

As described in further detail below in connection with FIG. 6, the scenarios as described in connection with FIG. 5 may in one embodiment be listed according to a predefined tuner "ranking" or "priority" as:

Rank 1: active; recording; assignable.
Rank 2: active; recording; assignable; PIP.
Rank 3: active; recording; assignable; live.
Rank 4: inactive.
Rank 5: active; live; PIP.
Rank 6: active; live.
Rank 7: active; live; delayed.

Here, the tuner status "active; recording; assignable" is of greater rank or priority than the tuner status "active; recording; assignable; PIP," which is of greater rank or priority than the tuner status "active; recording; assignable; live," which is of greater rank or priority than the tuner status "inactive," which is of greater rank or priority than the tuner status "active; live; PIP," which is of greater rank or priority than the tuner status "active; live," and which is of greater rank or priority than the tuner status "active; live; delayed." Other embodiments are possible.

As mentioned above, the timer status module 504 may further generate a listing that ranks each of the tuners 404a-c against each other based on each respective current status in response to receiving the indication of upcoming activation of the scheduled program recording timer. Continuing with the above-example tuner ranking or priority hierarchical structure, and assuming a particular determined status of each of the tuners 404a-c for purpose of example, the tuner 404a when associated with the "active; recording; assignable" tuner status may be specified within the listing ahead of the tuner 404b, when the tuner 404b is associated with the "active; recording; assignable; live" tuner status, and ahead of the tuner 404c, when the tuner 404c is associated with the "inactive" tuner status. Here, the ordered set of tuners within the listing may be itemized as "Rank 1: tuner 404a; Rank 2: tuner 404b; Rank 3: tuner 404c." Other embodiments are possible.

The timer status module 504 may activate the tuner allocation module 506 upon generating the listing that ranks each of the tuners 404a-c against each other based on each respective current status. In response, the tuner allocation module 506 may allocate a particular one of the tuners 404a-c for recording of the particular broadcast programming associated with the scheduled program recording timer. Continuing with the above-example ordered set of tuners, the tuner allocation module 506 may utilize the listing "Rank 1: tuner 404a; Rank 2: tuner 404b; Rank 3: tuner 404c," determine that tuner 404a is the "optimal" tuner for recording of the particular broadcast programming, and allocate the tuner 404a for recording of the particular broadcast programming. The tuner 404a is "optimal" because this tuner has a "higher" or "greater" ranking or priority within the listing than the tuner 404b and the tuner 404c.

There may be a number of benefits and advantages associated with such an implementation. For example, the tuner 404a is selected at least instead of tuner 404c, which in the example scenario is associated with the "inactive" tuner status. Since the tuner 404c is not allocated for recording of the particular broadcast programming, this tuner may remain "available" for other purposes. For example, the tuner 404c may be considered "at the ready" such that when a user turns on the television 214c there will be no conflict with providing the user instant access to either live or recoded programming. Other benefits and advantages are possible as well.

Figure 6:
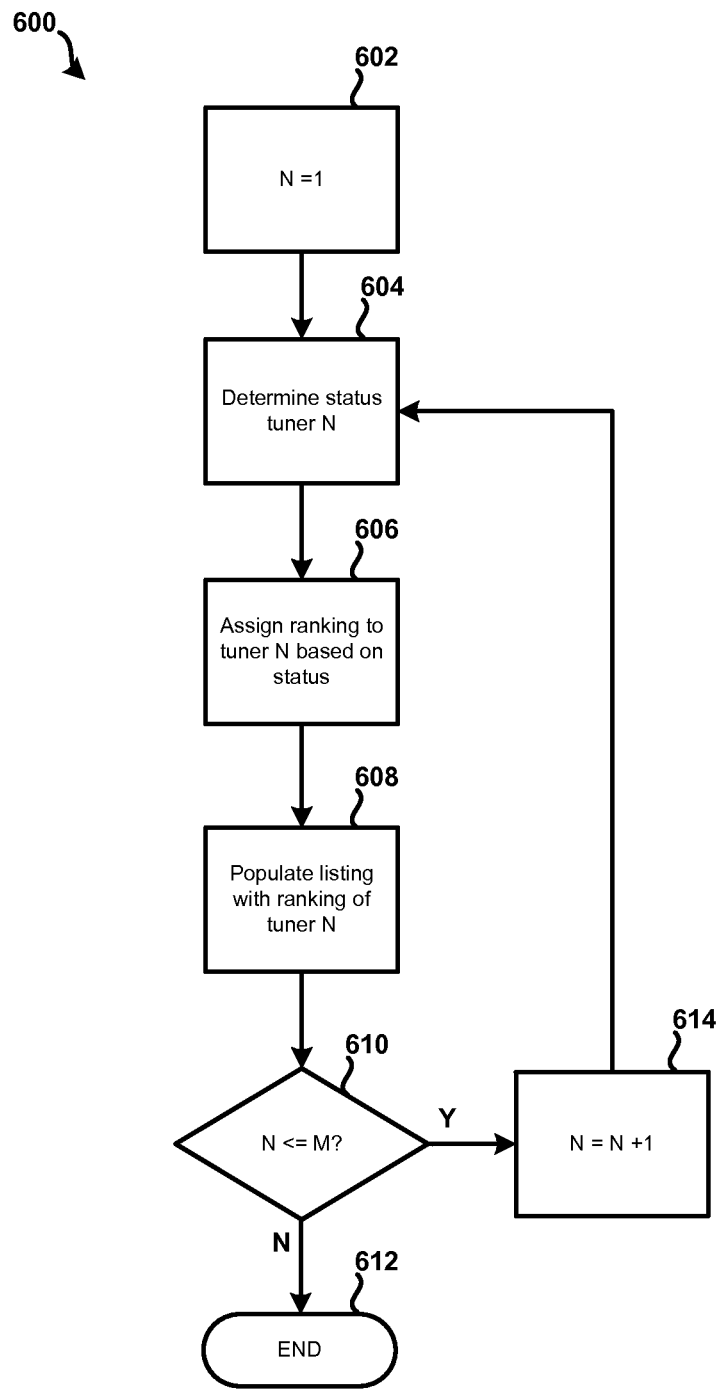
FIG. 6 shows an example method for determining a current status of each of a plurality of tuners of a television receiver.

Referring now to FIG. 6, an example method 600 is shown for determining a current status of each of a plurality of tuners of a television receiver. In one embodiment, the method 600 as described may be implemented by or on the PTR 210 of FIG. 2. Other embodiments are however possible. For example, one or more modules or steps of the example method 600 may be implemented by one or more of the other respective devices or components within the example system 200 of FIG. 2 as described above. Still other embodiments are possible.

At 602, the television receiver may set a counter to N=1.

At 604, the television receiver may determine a current status of a particular tuner N of a plurality of tuners M of the television receiver. In this example, N and M are integer values where N is less than or equal M. Initially, this may correspond to television receiver determining a current status of a first tuner (e.g., "Tuner 1") of the plurality of tuners M of the television receiver. As mentioned above in connection with FIG. 5, in one embodiment a current status of the particular tuner N may correspond to one of: a) "active; recording; assignable"; b) "active; recording; assignable; PIP"; c) "active; recording; assignable; live"; d) "inactive"; e) "active; live; PIP"; f) "active; live"; g) "active; live; delayed." Other embodiments are possible.

At 606, the television receiver may assign a ranking to the particular tuner N based on the current status of a particular tuner N. Continuing with the above example, the television receiver may: a) assign a "Rank 1" to the particular tuner N when the current status is determined "active; recording; assignable"; b) assign a "Rank 2" to the particular tuner N when the current status is determined "active; recording; assignable; PIP"; c) assign a "Rank 3" to the particular tuner N when the current status is determined "active; recording; assignable; live"; d) assign a "Rank 4" to the particular tuner N when the current status is determined "inactive"; e) assign a "Rank 5" to the particular tuner N when the current status is determined "active; live; PIP"; f) assign a "Rank 6" to the particular tuner N when the current status is determined "active; live"; g) assign a "Rank 7" to the particular tuner N when the current status of the particular tuner N is determined "active; live; delayed."

At 608, the television receiver may populate a listing based on the ranking of the particular tuner N. Initially, the listing may only have a single entry, such as "Rank 3; Tuner 1" for example. When N is greater than 1 but less than M however, the listing may have multiple entries such as "Rank 6; Tuner 1" and "Rank 6; Tuner 2" and "Rank 3; Tuner 3." Other embodiments are possible.

At 610, the television receiver may determine whether other tuners of the television receiver have yet to be ranked. When the television receiver determines that no other tuners of the television receiver have yet to be ranked, process flow may branch to 612. At 612, the television receiver may select a particular tuner of the plurality of tuners M having a "higher" or "greater" ranking within the listing than other ones of the plurality tuners M, and then allocate the particular tuner for recording of particular broadcast programming associated with a particular timer.

When the television receiver determines that other tuners of the television receiver have yet to be ranked, process flow may branch to 614 that iterates the counter to N=N+1. In this example, process flow proceeds in a loop until at 610 the television receiver determines that no other tuners of the television receiver have yet to be ranked. At 612, the television receiver may then select a particular tuner of the plurality of tuners M for recording of particular broadcast programming associated with a particular timer in manner as discussed above.

There may be a number of different scenarios that may arise when allocating a particular tuner for recording of the particular broadcast programming according to the principles of the present disclosure.

For example, in some DVR-related systems, it may be possible for a user to set-up a plurality of timers to activate or "fire" at a substantially similar or same time, a number of the timers being the same as the number of tuners available to the system. In this example, activation of the timers may not be performed in parallel. Rather, activation of timers may be performed in sequence or series. For example, even though being set to activate at a substantially similar or same time, a "Timer A" may fire before a "Timer B," which may fire before a "Timer C." Here, process flow in ranking of the tuners based on a predefined tuner ranking or priority, such as referred to above in connection with at least FIGS. 5-6, may take into account status of the respective tuners following assignment of a particular tuner to each particular timer.

For example, in practice, a first iteration of the example method 600 of FIG. 6 may be implemented such that a first tuner may initially be assigned to "Timer A." A second iteration of the example method 600 of FIG. 6 may then be implemented such that a second tuner may be assigned to "Timer B." A third iteration of the example method 600 of FIG. 6 may then be implemented such that a third tuner may be assigned to "Timer C." Here, the status of the first tuner assigned to "Timer A" may change from the first iteration to the second iteration, and the status of the second tuner assigned to "Timer B" may change from the second iteration to the third iteration. In these examples, the television receiver takes into account the "current" tuner status in each iteration or implementation of the example method 600 of FIG. 6.

In other examples, in some DVR-related systems, it may be possible that all available tuners of the system are being used to watch "live" programming. In this example, a "Timer A" may fire during a time when all available tuners of the system are being used to watch "live" programming. This may correspond to all tuners associated with a "Rank 6" status or priority, such as referred to above in connection with at least FIGS. 5-6. Here, the television receiver may provide users an option for allowing, or denying, a particular tuner associated with particular programming currently being watched to be allocated for the recording of a program associated with the "Timer A." This may in some embodiments be performed in accordance with a predefined priority.

For example, and referring now additionally to FIG. 3, the PTR 210 may first provide a "pop-up" 226 for display on the television 214c, providing a user an option for allowing a tuner associated with programming currently being watched on the television 214c to be allocated for the recording of a program associated with the "Timer A." In this example, the viewing experience of the user watching the programming on the television 214c may be interrupted when the tuner associated with programming currently being watched on the television 214c is forcibly allocated for the recording of a program associated with the "Timer A." When or if the user declines, the PTR 210 may then provide the "pop-up" 226 for display on the television 214a, providing a user an option for allowing a tuner associated with programming currently being watched on the television 214a to be allocated for the recording of a program associated with the "Timer A." When or if the user declines, the PTR 210 may then provide the "pop-up" 226 for display on the television 214b, providing a user an option for allowing a tuner associated with programming currently being watched on the television 214b to be allocated for the recording of a program associated with the "Timer A." In this example, when or if the user declines, the PTR 210 may then ignore the "Timer A," such that the viewing experience of none of the users watching the programming on the television 214a-c may be interrupted. Of course, when or if a particular user accepts the option for allowing a tuner associated with programming currently being watched, an associated tuner may be allocated for the recording of a program associated with the "Timer A."

Figure 7:
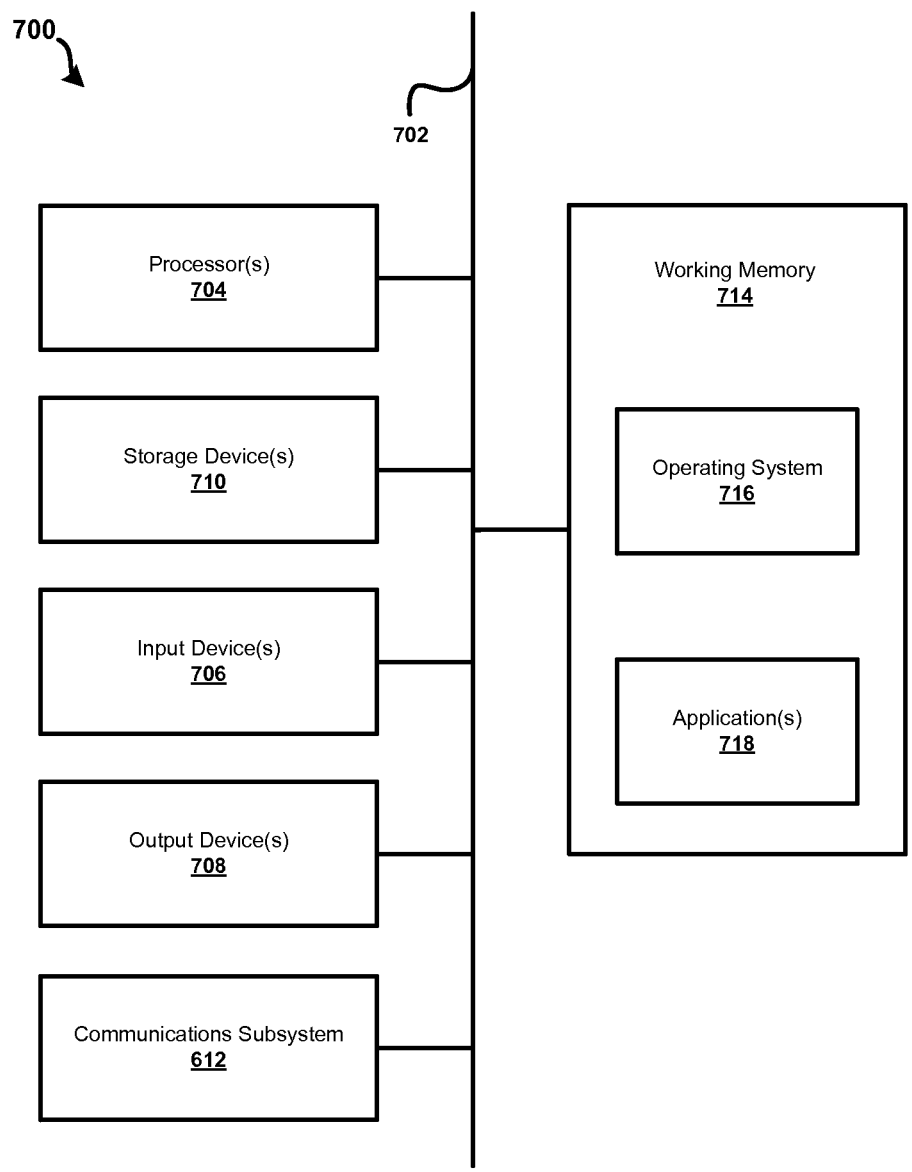
FIG. 7 shows an example computing system or device.

FIG. 7 shows an embodiment of an example computer system or device 700 in accordance with the present disclosure. An example of a computer system or device includes an enterprise server, blade server, desktop computer, laptop computer, personal data assistant, smartphone, gaming console, set-top-box, and any other type machine for performing calculations. The computer system 700 may be wholly or at least partially incorporated as part of previously-described computing devices, such as the PTR 210, the secondary television receivers 212a-b, the televisions 214a-c, and the computing devices 216a-b of FIG. 2. The example computer device 700 may be configured to perform and/or include instructions that, when executed, cause the computer system 700 to perform the method of FIG. 1 and FIG. 6. The example computer device 700 may be configured to perform and/or include instructions that, when executed, cause the computer system 700 to instantiate and implement functionality of the tuner allocation engine 218 as described above.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which can include without limitation a remote control, a mouse, a keyboard, and/or the like; and one or more output devices 708, which can include without limitation a presentation device (e.g., television), a printer, and/or the like.

The computer system 700 may further include (and/or be in communication with) one or more non-transitory storage devices 710, which can comprise, without limitation, local and/or network accessible storage, and/or can include, without limitation, a disk drive, a drive array, an optical storage device, a solid-state storage device, such as a random access memory, and/or a read-only memory, which can be programmable, flash-updateable, and/or the like. Such storage devices may be configured to implement any appropriate data stores, including without limitation, various file systems, database structures, and/or the like.

The computer device 700 might also include a communications subsystem 712, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 712 may permit data to be exchanged with a network (such as the network described below, to name one example), other computer systems, and/or any other devices described herein. In many embodiments, the computer system 700 will further comprise a working memory 714, which may include a random access memory and/or a read-only memory device, as described above.

The computer device 700 also can comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the invention. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving, by a television receiver device comprising a plurality of tuners, a request to record a particular broadcast program at a scheduled future time;
   determining, by the television receiver device, a set of tuners from the plurality of tuners of the television receiver device that are assignable for recording at the scheduled future time;
   identifying within the set of tuners that are assignable for recording at the scheduled future time, one or more tuners that are currently being used for recording television programming, and one or more other tuners that are not currently in-use;
   assigning, by the television receiver device, a first tuner to record the particular broadcast program at the scheduled future time, based on the determination that the first tuner is in the set of tuners that are assignable for recording at the scheduled future time, and based on the determination that the first tuner is currently being used for recording television programming; and
   recording, by the television receiver device, the particular broadcast program using the first tuner.

2. The method of claim 1, wherein the request is received at a predetermined time prior to broadcast of the particular broadcast program.

3. The method of claim 1, further comprising:
   excluding, from the set of tuners that are assignable for recording at the scheduled future time, tuners of the television receiver device that are currently active and providing live content for presentation by a primary display of a presentation device.

4. The method of claim 1, further comprising:
   excluding, from the set of tuners that are assignable for recording at the scheduled future time, tuners of the television receiver device that are currently active and providing live content for presentation by a secondary display of a presentation device.

5. The method of claim 1, further comprising receiving the request at a predetermined time less than or equal to sixty seconds prior to broadcast of the particular broadcast program.

6. The method of claim 1, further comprising selecting the current status of each one of the plurality of tuners of the television receiver from one of seven possible statuses.

7. The method of claim 1, further comprising receiving a user-specified indication denying allocation of the first tuner for the recording of the particular broadcast program.

8. The method of claim 1, further comprising assigning a ranking to each of the set of tuners that are assignable for recording at the scheduled future time, wherein assigning the rankings comprises:
ranking a first subset of tuners determined to have a current status of active higher than a second subset of tuners determined to have a current status of inactive.

9. The method of claim 8, wherein assigning rankings to each of the set of tuners further comprises:
ranking the second subset of tuners determined to have a current status of inactive higher than a third subset of tuners determined to have a current status of active and providing live content for presentation.

10. The method of claim 1, wherein further comprising assigning a ranking to each of the set of tuners that are assignable for recording at the scheduled future time, wherein assigning the rankings comprises:
ranking a first subset of tuners determined to have a current status of active and providing live content for presentation via a picture-in-picture window of a display of a presentation device, higher than a second subset of tuners determined to have a current status of active and providing live content to a primary display of a presentation device.

11. The method of claim 10, wherein assigning rankings to each of the set of tuners further comprises:
ranking a third subset of tuners determined to have a current status of active and providing live delayed content for presentation via a presentation device, lower than either the first subset of tuners or the second subset of tuners.

12. A system, comprising:
one or more processors; and
a memory communicatively coupled with and readable by the one or more processors and having stored therein processor-readable instructions which, when executed by the one or more processors, cause the one or more processors to:
receive a request to record a particular broadcast program at a scheduled future time;
determine a set of tuners, from a plurality of tuners of a television receiver, that are assignable for recording at the scheduled future time;
identify within the set of tuners that are assignable for recording at the scheduled future time, one or more tuners that are currently being used for recording television programming, and one or more other tuners that are not currently in-use;
assign a first tuner to record the particular broadcast program at the scheduled future time, based on the determination that the first tuner is in the set of tuners that are assignable for recording at the scheduled future time, and based on the determination that the first tuner is currently being used for recording television programming; and
record the particular broadcast program using the first tuner.

13. The system of claim 12, the memory having stored therein further processor-readable instructions which, when executed by the one or more processors, cause the one or more processors to:
exclude, from the set of tuners that are assignable for recording at the scheduled future time, tuners that are currently active and providing live content for presentation by a primary display of a presentation device.

14. The system of claim 12, the memory having stored therein further processor-readable instructions which, when executed by the one or more processors, cause the one or more processors to:
exclude, from the set of tuners that are assignable for recording at the scheduled future time, tuners that are currently active and providing live content for presentation by a secondary display of a presentation device.

15. A non-transitory processor-readable medium comprising processor-readable instructions configured to cause one or more processors to:
receive request to record a particular broadcast program at a scheduled future time;
determine a set of tuners, from a plurality of tuners of a television receiver, that are assignable for recording at the scheduled future time;
identify within the set of tuners that are assignable for recording at the scheduled future time, one or more tuners that are currently being used for recording television programming, and one or more other tuners that are not currently in-use;
assign a first tuner to record the particular broadcast program at the scheduled future time, based on the determination that the first tuner is in the set of tuners that are assignable for recording at the scheduled future time, and based on the determination that the first tuner is currently being used for recording television programming; and
record the particular broadcast program using the first tuner.

* * * * *